(12) United States Patent
Boyd et al.

(10) Patent No.: US 11,142,993 B2
(45) Date of Patent: Oct. 12, 2021

(54) TESTABLE BACK PRESSURE VALVE AND PRESSURE TESTING SYSTEM THEREFOR

(71) Applicant: FMC Technologies, Inc., Houston, TX (US)

(72) Inventors: Gareth Boyd, Houston, TX (US); Brian J. Baca, Houston, TX (US)

(73) Assignee: FMG Technologies, Inc., Houston, TX (US)

(*) Notice: Subject to any disclaimer, the term of this patent is extended or adjusted under 35 U.S.C. 154(b) by 0 days.

(21) Appl. No.: 16/477,156

(22) PCT Filed: Mar. 17, 2018

(86) PCT No.: PCT/US2018/023043
§ 371 (c)(1),
(2) Date: Jul. 10, 2019

(87) PCT Pub. No.: WO2018/170500
PCT Pub. Date: Sep. 20, 2018

(65) Prior Publication Data
US 2019/0360292 A1 Nov. 28, 2019

Related U.S. Application Data

(60) Provisional application No. 62/473,252, filed on Mar. 17, 2017.

(51) Int. Cl.
*E21B 34/02* (2006.01)
*E21B 33/03* (2006.01)
(Continued)

(52) U.S. Cl.
CPC ............ *E21B 34/02* (2013.01); *E21B 33/03* (2013.01); *E21B 34/045* (2013.01); *E21B 34/08* (2013.01);
(Continued)

(58) Field of Classification Search
CPC .......... E21B 34/02; E21B 34/16; E21B 34/08
See application file for complete search history.

(56) References Cited

U.S. PATENT DOCUMENTS 2,748,873 A 6/1956 Baker et al.
2,919,709 A 1/1960 Schwegman
(Continued)

FOREIGN PATENT DOCUMENTS

WO WO 2009/067298 A1 5/2009
WO WO 2016/141113 A1 9/2016
WO WO 2016/182451 A1 11/2016

*Primary Examiner* — Tara Schimpf
(74) *Attorney, Agent, or Firm* — Henry C. Query, Jr.

(57) ABSTRACT

A testable back pressure valve for controlling fluid flow through a bore of a component installed in a well bore is disclosed. The back pressure valve includes a valve body which is configured to be secured in the bore, a flow bore which extends through the valve body, at least a first body seal which is configured to seal the valve body to the bore, and a poppet which is movably positioned in the valve body. At least a first poppet seal is sealingly engaged between the poppet and the valve body when the poppet is in the closed position, and a test port extends through the valve body to below the first poppet seal when the poppet is in the closed position. Thus, with the back pressure valve installed in the flow bore and the poppet in the closed position, the first poppet seal can be pressure tested by communicating test pressure through the test port to below the first poppet seal.

20 Claims, 10 Drawing Sheets

(51) Int. Cl.
*E21B 34/04* (2006.01)
*E21B 34/08* (2006.01)
*E21B 34/16* (2006.01)
*F16K 15/02* (2006.01)
*F16K 15/06* (2006.01)
*F16K 15/18* (2006.01)
*F16K 37/00* (2006.01)

(52) U.S. Cl.
CPC ............ *E21B 34/16* (2013.01); *F16K 15/026* (2013.01); *F16K 15/063* (2013.01); *F16K 15/18* (2013.01); *F16K 37/0066* (2013.01); *F16K 37/0091* (2013.01)

(56) References Cited

U.S. PATENT DOCUMENTS

| | | | |
|---|---|---|---|
| 4,712,619 | A | 12/1987 | Stepp et al. |
| 5,253,712 | A | 10/1993 | Swor |
| 5,320,181 | A | 6/1994 | Lantier, Sr. et al. |
| 5,782,297 | A | 7/1998 | Samuels et al. |
| 6,745,835 | B2 | 6/2004 | Fields |
| 8,539,976 | B1 | 9/2013 | Rodgers, Jr. et al. |
| 9,297,226 | B2 | 3/2016 | Nguyen et al. |
| 9,429,956 | B1 | 8/2016 | Levy |
| 10,787,883 | B2 * | 9/2020 | Montoya ............... F16K 15/026 |
| 2011/0011575 | A1 | 1/2011 | Nguyen et al. |
| 2014/0182863 | A1 | 7/2014 | Nguyen et al. |
| 2014/0216742 | A1 | 8/2014 | Darbe et al. |
| 2017/0009555 | A1 | 1/2017 | Nguyen |

* cited by examiner

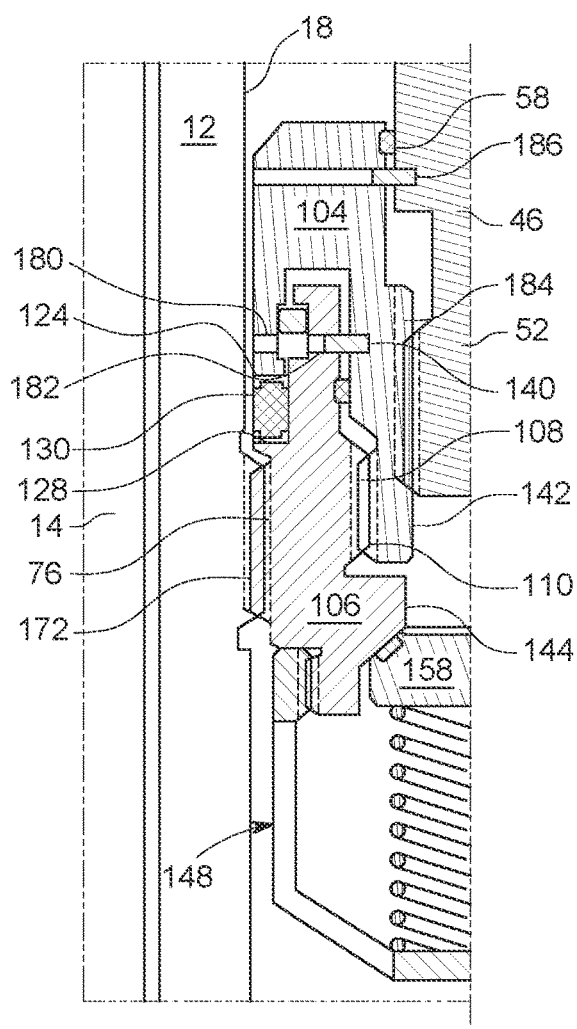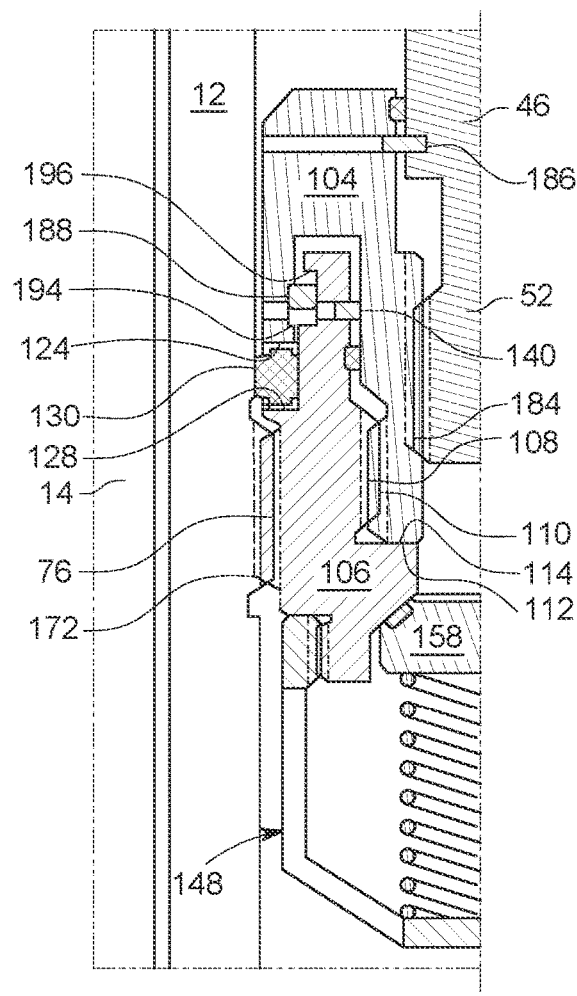
FIG. 6
FIG. 7

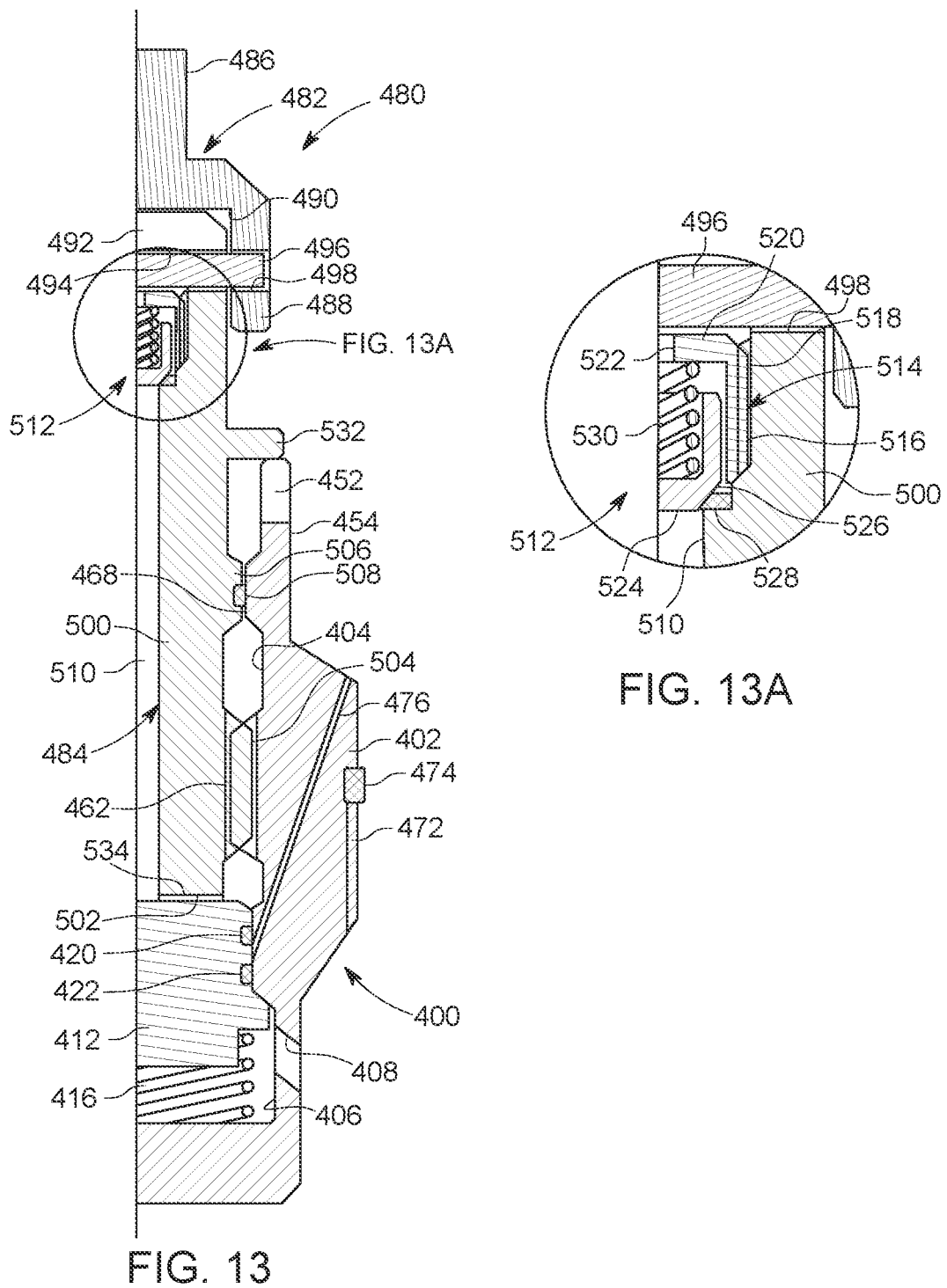

TESTABLE BACK PRESSURE VALVE AND PRESSURE TESTING SYSTEM THEREFOR

BACKGROUND OF THE DISCLOSURE

The present disclosure is directed to a back pressure valve for use in, e.g., a hydrocarbon well. In particular, the disclosure is directed to a back pressure valve which includes a number of seals that can be pressure tested from below, i.e., in the direction of production flow, and a system for pressure testing the seals.

Back pressure valves are used in the hydrocarbon production industry to control the flow of fluid through the well bore. These valves are usually installed in the bore of a component which is positioned in the well bore, such as in the production bore of a tubing hanger which is landed in a wellhead that is located at the upper end of the well bore. Back pressure valves typically include a valve body, a flow bore which extends axially through the valve body, and a poppet which is movably supported in the flow bore. The poppet is movable between a closed position in which fluid in the well bore below the back pressure valve is prevented from flowing up through the flow bore, and an open position in which fluid above the back pressure valve is permitted to flow down through the flow bore and into the well bore.

In order to provide a pressure tight barrier when the back pressure valve is in the closed position, the valve body is typically sealed to the tubing hanger bore with at least one body seal, and the poppet is sealed to the flow bore with at least one poppet seal. However, these seals are sometimes subject to failure. In such a case, the back pressure valve will cease to operate effectively.

Therefore, a need exists for a back pressure valve in which at least one of the body seal and the poppet seal can be pressure tested prior to placing the back pressure valve into operation. A need also exists for a system for pressure testing the at least one of the body seal and the poppet seal.

SUMMARY OF THE DISCLOSURE

In accordance with the present disclosure, a testable back pressure valve for controlling fluid flow through a bore of a component which is installed in a well bore is provided. The back pressure valve comprises a valve body which is configured to be secured in the bore; a flow bore which extends through the valve body; at least a first body seal which is configured to seal the valve body to the bore; a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve; at least a first poppet seal which is sealingly engaged between the poppet and the valve body when the poppet is in the closed position; and a test port which extends through the valve body to below the first poppet seal when the poppet is in the closed position. Thus, with the back pressure valve installed in the flow bore and the poppet in the closed position, the first poppet seal can be pressure tested by communicating a test pressure through the test port to below the first poppet seal.

In one aspect, the test port extends through the valve body from below the first body seal; wherein with the back pressure valve installed in the flow bore and the poppet in the closed position, the first body seal can be pressure tested by communicating test pressure to a portion of the bore located below the first body seal, and the first poppet seal can be pressure tested by communicating the test pressure through the test port to below the first poppet seal.

In another aspect, the back pressure valve further comprises a second poppet seal which is positioned below the first poppet seal and is sealingly engaged between the poppet and the valve body when the poppet is in the closed position; wherein the test port extends through the valve body to between the first and second poppet seals; and wherein with the back pressure valve installed in the flow bore and the poppet in the closed position, the first and second poppet seals can be pressure tested by communicating the test pressure through the test port to between the first and second poppet seals.

In yet another aspect, the back pressure valve further comprises a second body seal which is positioned below the first body seal and is configured to seal the valve body to the bore; wherein the test port extends through the valve body from between the first and second body seals; and wherein with the back pressure valve installed in the flow bore and the poppet in the closed position, the first and second body seals can be pressure tested by communicating test pressure to a portion of the bore located between the first and second body seals, and the first and second poppet seals can be pressure tested by communicating the test pressure through the test port to between the first and second poppet seals.

In a further aspect, the component comprises a hanger device which is landed in a wellhead component, wherein the bore comprises a hanger device bore which extends axially through the hanger device, and wherein the test pressure is communicated to the test port through a first communications port in the hanger device.

In another aspect, the test pressure is communicated to the first communications port through a pressure control device which is mounted to the wellhead component above the hanger device.

In yet another aspect, the pressure control device comprises a pressure control device bore which is connected to the hanger device bore, and wherein the test pressure is communicated to the first communications port through the pressure control device bore and the hanger device bore.

In a further aspect, the test pressure is communicated to the first communications port through a second communications port in the wellhead component.

In one aspect, the test port extends through the valve body from below the first body seal; wherein with the back pressure valve installed in the flow bore and the poppet in the closed position, the first body seal can be pressure tested by communicating test pressure to a portion of the bore located above the first body seal, and the first poppet seal can be pressure tested by communicating the test pressure through the test port to below the first poppet seal.

In another aspect, the back pressure valve further comprises a second poppet seal which is positioned below the first poppet seal and is sealingly engaged between the poppet and the valve body when the poppet is in the closed position; wherein the test port extends through the valve body to between the first and second poppet seals; and wherein with the back pressure valve installed in the flow bore and the poppet in the closed position, the first and second poppet seals can be pressure tested by communicating the test pressure through the test port to between the first and second poppet seals.

In yet another aspect, the component comprises a hanger device which is landed in a wellhead component, wherein the bore comprises a hanger device bore which extends axially through the hanger device, and wherein the test pressure is communicated to the test port through a pressure control device which is mounted to the wellhead component above the hanger device.

In a further aspect, the pressure control device comprises a pressure control device bore which is connected to the hanger device bore, and wherein the test pressure is communicated to the test port through the pressure control device bore and the hanger device bore.

The present disclosure is also directed to a method for installing a back pressure valve in a component which is positioned in a well bore and then testing the back pressure valve. The back pressure valve comprises a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position. The method comprises the steps of securing the valve body in the bore; with the poppet in the closed position, communicating a test pressure to below the first poppet seal; and monitoring at least one of a pressure of the test pressure and a pressure in a space above the back pressure valve; wherein a change in at least one of the pressure of the test pressure and the pressure in the space above the back pressure valve is an indication that the first poppet seal has failed.

In one aspect, the method further comprises, during the step of communicating the test pressure to below the first poppet seal, simultaneously communicating the test pressure to below the first body seal; wherein a change in at least one of the pressure of the test pressure and the pressure in the space above the back pressure valve is an indication that at least one of the first poppet seal and the first body seal has failed.

In another aspect, the back pressure valve comprises a second poppet seal which is positioned below the first poppet seal and is sealingly engaged between the poppet and the valve body when the poppet is in the closed position, and wherein the method further comprises, during the step of communicating the test pressure to below the first poppet seal, simultaneously communicating the test pressure to between the first and second poppet seals; where a decrease in the pressure of the test pressure is an indication that the second poppet seal has failed; and wherein an increase in the pressure in the space above the back pressure valve is an indication that at least one of the first poppet seal and the first body seal has failed.

In yet another aspect, the back pressure valve comprises a second body seal which is positioned below the first body seal and is configured to seal the valve body to the bore, and wherein the method further comprises, during the step of communicating the test pressure to between the first and second poppet seals, simultaneously communicating the test pressure to between the first and second body seals; where a decrease in the pressure of the test pressure is an indication that at least one of the second poppet seal and the second body seal has failed; and wherein an increase in the pressure in the space above the back pressure valve is an indication that at least one of the first poppet seal and the first body seal has failed.

In still another aspect, the method further comprises sealing the bore below the back pressure valve; during the step of communicating the test pressure to below the first poppet seal, simultaneously communicating the test pressure to below the first body seal; wherein an increase in the pressure in the space above the back pressure valve is an indication that at least one of the first poppet seal and the first body seal has failed.

In a further aspect, the steps of communicating the test pressure to below the first poppet seal and to below the first body seal comprises decreasing the pressure in the space above the back pressure valve to below a pressure in the sealed bore below the back pressure valve.

In another aspect, the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises sealing the flow bore above the poppet; wherein a decrease in the pressure of the test pressure is an indication that the first poppet seal has failed.

In yet another aspect, the method further comprises, during the step of communicating the test pressure to below the first poppet seal, simultaneously communicating the test pressure to above the first body seal; wherein a decrease in the pressure of the test pressure is an indication that at least one of the first poppet seal and the first body seal has failed.

In still another aspect, the back pressure valve comprises a second poppet seal which is positioned below the first poppet seal and is sealingly engaged between the poppet and the valve body when the poppet is in the closed position, and wherein the method further comprises, during the step of communicating the test pressure to below the first poppet seal, simultaneously communicating the test pressure to between the first and second poppet seals; wherein a decrease in the pressure of the test pressure is an indication that at least one of the first poppet seal, the second poppet seal and the first body seal has failed.

In a further aspect, the steps of communicating the test pressure to between the first and second poppet seals and to above the first body seal comprises introducing the test pressure into the space above the back pressure valve.

In another aspect, the back pressure valve comprises a second body seal which is positioned above the first body seal and is configured to seal the valve body to the bore, and wherein the method further comprises, during the step of communicating the test pressure to between the first and second poppet seals, simultaneously communicating the test pressure to between the first and second body seals; where a decrease in the pressure of the test pressure is an indication that at least one of the first poppet seal, the second poppet seal and the first body seal has failed; and wherein an increase in the pressure in the space above the back pressure valve is an indication that the second body seal has failed.

In yet another aspect, the method further comprises prior to the step of securing the valve body in the bore, connecting the valve body to an installation tool; and lowering the back pressure valve through the bore on the installation tool; wherein the step of sealing the flow bore above the poppet comprises sealing the installation tool to a portion of the valve body located in or contiguous with the flow bore.

In still another aspect, the back pressure valve comprises a piston chamber within which a piston is slidably received, wherein the test port is connected to the piston chamber on a first side of the piston, and wherein the step of communicating the test pressure to below the first poppet seal comprises filling the test port with a well fluid; and communicating the test pressure to the piston chamber on a second side of the piston; wherein the test pressure is transmitted through the piston to the well fluid in the test port.

Thus, the testable back pressure valve comprises a poppet seal and a body seal, and the pressure testing system includes means for pressure testing at least one of the seals after the back pressure valve has been installed in the well bore. Moreover, in one embodiment the testable back pressure valve and/or the pressure testing system are configured such that the at least one seal can be pressure tested from below, i.e., in the direction of flow of the wellbore fluid.

These and other objects and advantages of the present disclosure will be made apparent from the following detailed description, with reference to the accompanying drawings. In the drawings, the same reference numbers may be used to denote similar components in the various embodiments.

BRIEF DESCRIPTION OF THE DRAWINGS

FIG. 6 is a cross sectional view of the left half of the back pressure valve of FIG. 5 shown being installed in a representative tubing hanger, it being understood that the right half is symmetrical to the left half;

FIG. 7 is a cross sectional view similar to FIG. 6 but showing the back pressure valve fully installed in the tubing hanger;

FIG. 13 is a cross sectional view of the back pressure valve of FIG. 10 shown together with its retrieval tool, it being understood that the left half would be a mirror image of the right half; and FIG. 13A is an enlarged cross sectional view of the portion of the back pressure valve indicated by the designation 13A in FIG. 13.

DETAILED DESCRIPTION OF THE DISCLOSURE

The back pressure valve and pressure testing system of the present disclosure includes a back pressure valve for a hydrocarbon production well and a system for testing the sealing integrity of the back pressure valve. In one embodiment, the back pressure valve is installed in a hanger device which is connected to the top of a string of tubulars that extends into the well. The hanger device is landed in a wellhead component which is located at the upper end of the well bore, and a pressure control apparatus is connected to the top of the wellhead component to control the flow of fluids from the well. In use, the back pressure valve acts as a check valve which in the closed position prevents fluids from flowing up through the string of tubulars to the pressure control device and in the open position allows fluids to flow from the pressure control device down through the string of tubulars.

Figure 1:
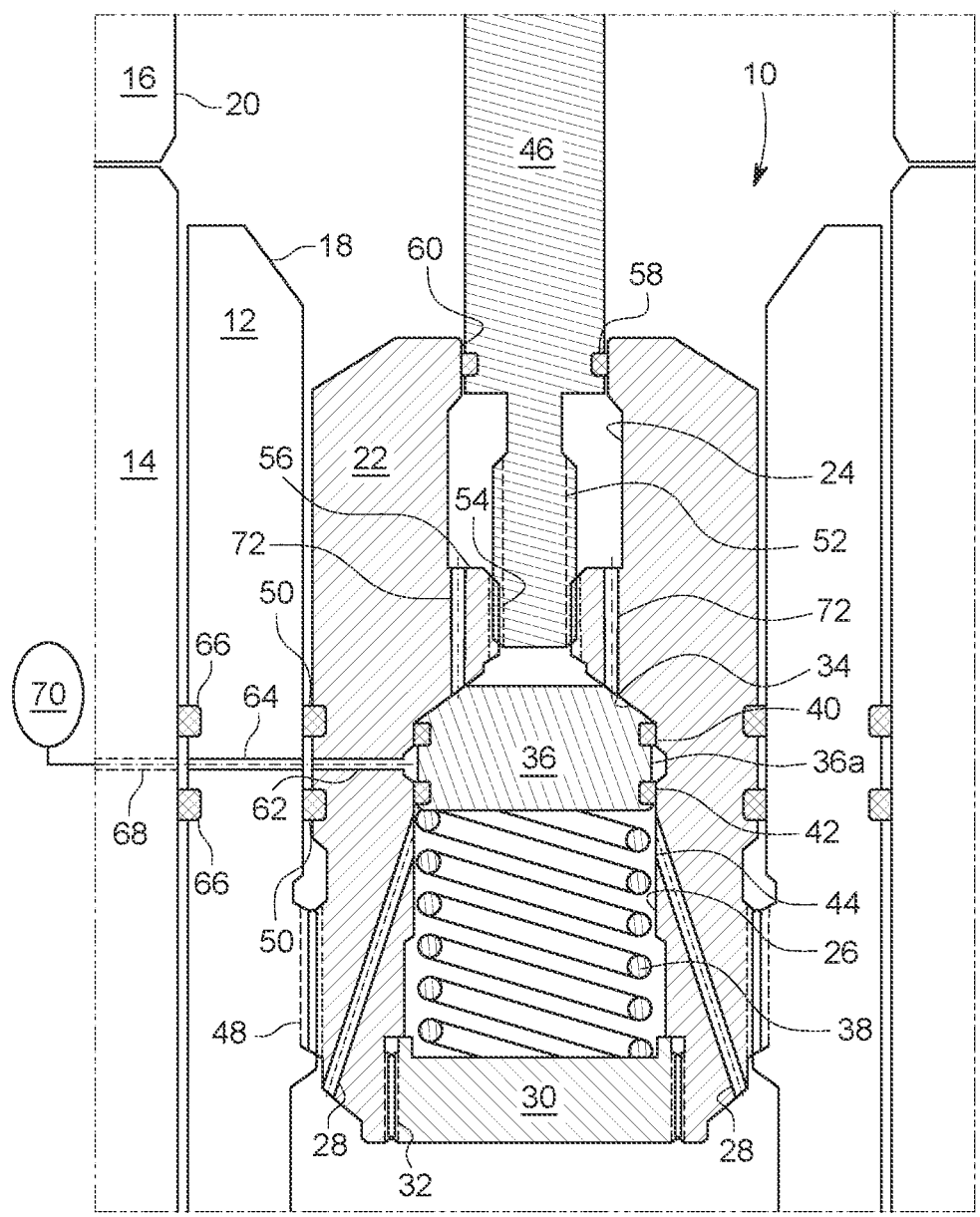
FIG. 1 is a cross sectional view of a first embodiment of a back pressure valve and pressure testing system of the present disclosure.

A first embodiment of the back pressure valve and pressure testing system of the present disclosure is shown in FIG. 1. The back pressure valve of this embodiment, which is indicated generally by reference number 10, is shown installed in a hanger device in the form of a tubing hanger 12. The tubing hanger 12 is landed in a wellhead component in the form of a wellhead 14, and a pressure control apparatus in the form of a christmas tree 16 is connected to the top of the wellhead. In FIG. 1, the tubing hanger, wellhead 14 and christmas tree 16 are shown only partially for purposes of simplicity. The tubing hanger 12 includes an axial production bore 18 against which the back pressure valve 10 is configured to seal, and the tree 16 includes a tree bore 20 which in the absence of the back pressure valve is open to the production bore.

It should be understood that the hanger device can comprise any device which functions to suspend a string of tubulars from the wellhead component, such as a casing hanger or similar device, and that the wellhead component can comprise any device which is located at the top of the well bore or is mounted to the top of the wellhead and which functions to support the hanger device, such as a tubing spool, a spacer spool, a tubing head or similar component. Likewise, the pressure control apparatus can comprise any apparatus which functions to control the flow of fluids from the well, such as a blow out preventer ("BOP"), a test tree or similar apparatus. These components form no part of the back pressure valve of the present disclosure and should not be interpreted as a limitation thereof.

As shown in FIG. 1, the back pressure valve 10 comprises an annular body 22 which is configured to be received in the tubing hanger bore 18. The valve body 22 includes an axial flow bore 24 which is connected to a poppet chamber 26 that in turn is connected via a number of flow-through bores 28 to a portion of the tubing hanger bore 18 located below the back pressure valve 10. The poppet chamber 26 is closed by a retainer cap 30 which is secured to the valve body 22 by suitable means, such as a threaded connection 32. A valve seat 34 is formed in the flow bore 24 above the poppet chamber 26. The valve seat 34 is engaged by a poppet 36 which is configured to be slidably received in the poppet chamber 26. The poppet 36 is biased into engagement with the valve seat 34 by a spring 38 which is operatively engaged between the poppet and the retainer cap 30. In the embodiment of the back pressure valve 10 shown in FIG. 1, the poppet 36 comprises a cylindrical side surface 36a which is sealed to the poppet chamber 26 by suitable first and second annular poppet seals 40, 42, each of which is mounted in a respective circumferential groove (not shown).

Figure 2:
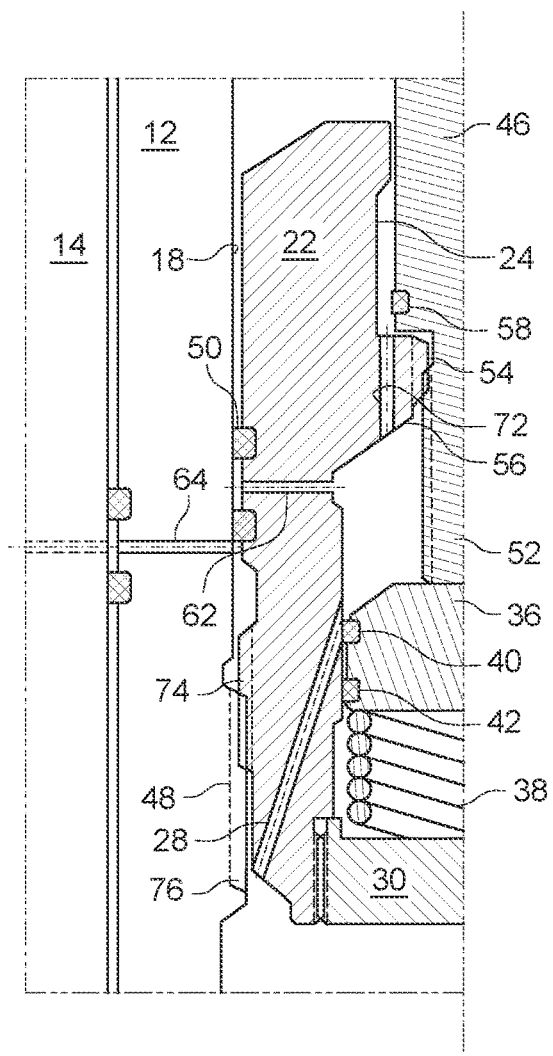
FIG. 2 is a cross sectional view of the left half of the back pressure valve of FIG. 1 shown being installed in a representative tubing hanger, it being understood that the right half is symmetrical to the left half.
Figure 3:
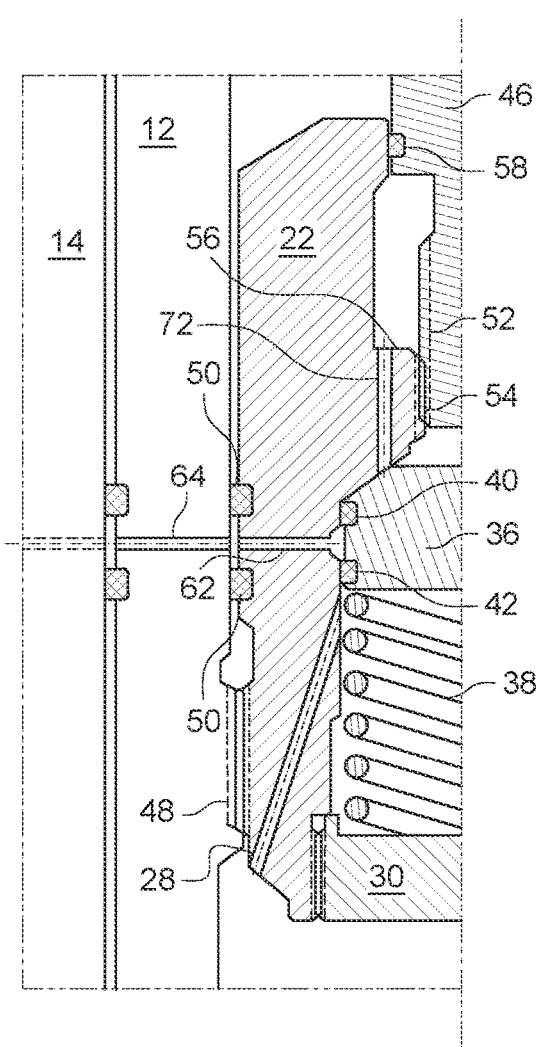
FIG. 3 is a cross sectional view similar to FIG. 2 but showing the back pressure valve in position for being pressure tested.

Referring also to FIGS. 2 and 3, the poppet 36 is movable between a closed position (shown in FIGS. 1 and 3), in which fluid is prevented from flowing upward from the flow-through bores 28 to the flow bore 24, and an open position (shown in FIG. 2), in which fluid is permitted to flow downward from the flow bore to the flow-through bores. Each flow through-bore 28 includes an end 44 which intersects the poppet chamber 26. When the poppet 36 is in the closed position, the second (or lower) poppet seal 42 is located above the ends 44 of the flow-through bores 28. In this position, the second poppet seal 42 (or should the second seal fail, the first poppet seal 40) will block fluid from flowing through the flow-through bores 28 into the flow bore 24. Hence, the back pressure valve 10 will prevent fluid in the well bore from flowing into the tree 16. When the poppet 36 is in the open position (FIG. 2), the first (or upper) poppet seal 40 is located below the ends 44 of the flow-through bores 28. In this position, fluid is permitted to flow from the flow bore 24 into the flow-through bores, and the back pressure valve 10 will thus allow fluid from the tree 16 to flow into the well bore.

In the embodiment shown in FIG. 1, the back pressure valve 10 is installed using an installation tool in the form of a lubricator rod 46 which is connected to a conventional lubricator (not shown). Also, the back pressure valve 10 is secured to the tubing hanger 12 via a threaded connection 48 and is sealed to the tubing hanger bore 18 using a pair of suitable annular body seals 50 mounted to the outer diameter surface of the valve body 22. It should be understood, however, that the back pressure valve 10 can be installed using other components and can be secured to the tubing hanger 12 using other means, such as a ratch-latch or locking dog arrangement. The lubricator rod 46 comprises a reduced diameter lower end 52 having outer threads that engage corresponding inner threads in a socket 54 that in this particular embodiment is formed in a reduced diameter portion 56 of the flow bore 24. In this manner, rotating the lubricator rod 46 relative to the valve body 22 will cause the lubricator rod to move axially relative to the back pressure valve 10. For purposes which will be made apparent below, the lubricator rod 46 carries a suitable rod seal 58 which when the poppet 36 is in the closed position engages a collar 60 that is formed in the valve body 22 at the upper end of the flow bore 24.

In accordance with the present disclosure, a system is provided for testing the pressure integrity of at least the first poppet seal 40. In the particular embodiment shown in FIG. 1, the pressure testing system includes a test port 62 which extends through the valve body 22 to a space located between the first and second poppet seals 40, 42. The test port 62 is fluidly connected by suitable means to a source of test pressure. For example, the test port 62 may extend to between the body seals 50 and be fluidly connected to a communications port 64 which in turn is connected to a source of test pressure. In the embodiment shown in FIG. 1, the communications port 64 extends to a space between a pair of outer diameter seals 66 which are engaged between the tubing hanger 12 and the wellhead 14. The communications port 64 is fluidly connected to a second communications port 68 which extends through the wellhead 14 and is fluidly connected to a source of test pressure 70. This arrangement allows for testing of not only the upper poppet seal 40, but also the upper body seal 50.

In one embodiment, pressure testing of the seals 40, 50 is performed with the poppet 36 in the closed position and the rod seal 58 engaged with the collar 60. During pressure testing, test pressure is communicated through the first and second communications ports 64, 68 to the space between the body seals 50, and from there through the test port 62 to the space between the first and second poppet seals 40, 42. At the same time, the pressure in the tree bore 20 is monitored using conventional means. If the upper body seal 50 should leak, the test pressure will flow between the tubing hanger 12 and the valve body 22 and result in an increase in pressure in the tree bore 20. Thus, an increase in pressure in the tree bore 20 will provide an indication that the upper body seal 50 is leaking. If the upper poppet seal 40 should leak, the test pressure will force the poppet 36 open and flow past the poppet into the well bore, which will result in a drop in the test pressure as measured at the source 70. On the other hand, If the lower poppet seal 42 should leak, the test pressure will escape into the well bore, which will similarly result in a drop in the test pressure as measured at the source 70. Thus a decrease in the test pressure will provide an indication that either the upper poppet seal 40 or the lower poppet seal 42 is leaking.

In an alternative pressure testing system for the embodiment shown in FIG. 1, the lubricator rod is unthreaded from the socket 54 until the rod seal 58 is clear of the collar 60. Test pressure is then communicated to the space between the body seals 50 and the space between the poppet seals 40, 42 in the manner described above. If the upper poppet seal 40 should leak, pressure will be communicated past the poppet 36 and through a number of bypass bores 72 in the reduced diameter portion 56 of the flow bore 24. This pressure will then flow between the lubricator rod 46 and the collar 60 and result in an increase in the pressure in the tree bore 20. Alternatively, if the upper body seal 50 should leak, the test pressure will flow between the tubing hanger 12 and the valve body 22 and result in an increase in the pressure in the tree bore 20. Thus, an increase in the pressure in the tree bore 20 will provide an indication that either the upper poppet seal 40 or the upper body seal 50 is leaking. This method may be suitable for testing the integrity of the upper poppet seal 40 if, for example, the body seals 50 are of the type that known to be reliable.

The procedure for installing the back pressure valve 10 in the tubing hanger 12 will now be described with reference to FIGS. 2 and 3. First, with the lubricator (not shown) disconnected from the tree, the lower end 52 of the lubricator rod 46 is threaded into the socket 54. The lower end 52 and the socket 54 are designed to have right-handed threads. Thus, by rotating the lubricator rod 46 clockwise relative to body 22, the lower end 52 will move through the socket 54 towards the poppet 36. Continued clockwise rotation of the lubricator rod 46 will bring the lower end 52 in to engagement with the poppet 36 and force the poppet into its fully open position (FIG. 2). In this position, the spring 38 may be configured to be fully compressed to thereby prevent the poppet 36 from moving further downward, or a stop (not shown) may be positioned between the poppet and the retainer cap 30 to prevent further downward movement of the poppet. The lubricator rod 46 is then torqued tight to firmly secure the lower end 52 to the body 22.

The lubricator is then connected to the tree 14 and the lubricator rod 46 is stroked downward to move the back pressure valve 10 into the tubing hanger 12. This action is continued until the outer threads 74 on the valve body 22 land on the inner threads 76 in the tubing hanger bore 18. During this step, the lubricator rod 46 maintains the poppet 36 in its open position to allow well fluids to flow through the flow-through bores 28 and the bypass bores 72 and thereby bypass the back pressure valve 10. The threads 74, 76 are designed to be left-handed. Thus, once the outer threads 74 land on the inner threads 76, the lubricator rod 46 is rotated counterclockwise to screw the body 22 into the inner threads 76 and thereby secure the back pressure valve 10 to the tubing hanger 12. During this step, the lubricator rod 46 is prevented from backing out of the socket 54 due to the torque differential between the lower end 52 and the outer threads 74. When the outer threads 74 bottom out on the inner threads 76, the test port 62 will be aligned with the communications port 64 (FIG. 3). Then, further rotation of the lubricator rod 46 in the counterclockwise direction will retract the lubricator rod and allow the poppet 36 to close.

With the lubricator rod 46 still connected to the back pressure valve 10, the upper poppet seal 40 and/or the upper body seal 50 is pressure tested in accordance with one of the procedures described above. If the seals pass the pressure test, the lubricator rod 46 is rotated clockwise to unscrew the lower end 52 from the socket 54. The lubricator may then be disconnected from the tree.

Figure 4:
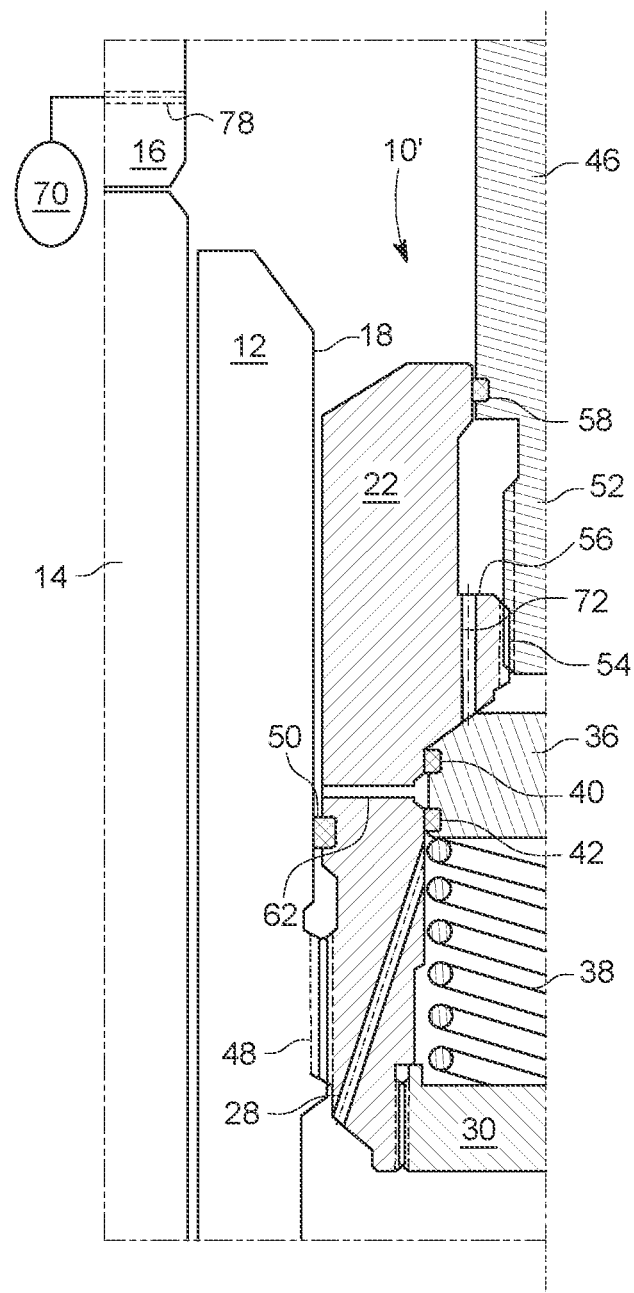
FIG. 4 is a cross sectional view of the left half of a second embodiment of a back pressure valve and pressure testing system of the present disclosure, it being understood that the right half would be a mirror image of the left half.

An alternative embodiment of a back pressure valve and pressure testing system of the present disclosure is shown in FIG. 4. The back pressure valve of this embodiment, which is indicated generally by reference number 10', may be similar to the back pressure valve 10 described above. However, in this embodiment the upper body seal 50 between the valve body 22 and the tubing hanger 12 is omitted.

In order to pressure test the upper poppet seal 40, the lubricator rod is unscrewed from the socket 54 until the poppet 36 is closed and the lubricator rod 46 is sealed to the collar 60 via the rod seal 58. Test pressure from a suitable source 70 is then introduced into the tree bore 20 through a communications port 78 in the tree 16. The test pressure is communicated from the port 78 to the annulus between the valve body 22 and the tubing hanger bore and then through the test port 62 to the space between the first and second poppet seals 40, 42. If the upper poppet seal 40 should leak, the test pressure will force the poppet 36 open and flow past the poppet into the well bore, which will result in a drop in the test pressure as measured at the source 70. Likewise, If the lower poppet seal 42 should leak, the test pressure will escape into the well bore, which will similarly result in a drop in the test pressure as measured at the source 70. If the body seal 50 should leak, the test pressure will escape into the well bore, which will also result in a drop in the test pressure as measured at the source 70. Thus a decrease in the test pressure will provide an indication that either the upper poppet seal 40, the lower poppet seal 42 or the body seal 50 is leaking.

Another embodiment of the back pressure valve and pressure testing system of the present disclosure will be described with reference to FIG. 5. The back pressure valve of this embodiment, which is indicated generally by reference number 100, is shown installed in a pressure test fixture 102, the purpose of which will be described below. The back pressure valve 100 includes an upper body 104 which is axially movably connected to a lower body 106. In the particular embodiment of the back pressure valve 100 shown in FIG. 5, for example, the upper body 104 includes a shaft 108 which is threadedly connected to a corresponding receptacle 110 in the lower body 106 such that rotation of the upper body relative to the lower body will cause the upper body move axially relative to the lower body. In this example, the shaft 108 comprises a bottom end 112 which is ideally configured to engage a bottom surface 114 of the receptacle 110 to thereby prevent further downward movement of the upper body 104 relative to the lower body 106. Although not required, the shaft 108 may also comprise an enlarged diameter upper portion 116 which is configured to be received in a corresponding recess 118 formed in the lower body 106 above the receptacle. For reasons which will be made apparent below, the upper portion 116 of the shaft 108 is sealed to the lower body 106 via a suitable annular seal 120 which is mounted in the recess 118.

Figure 5:
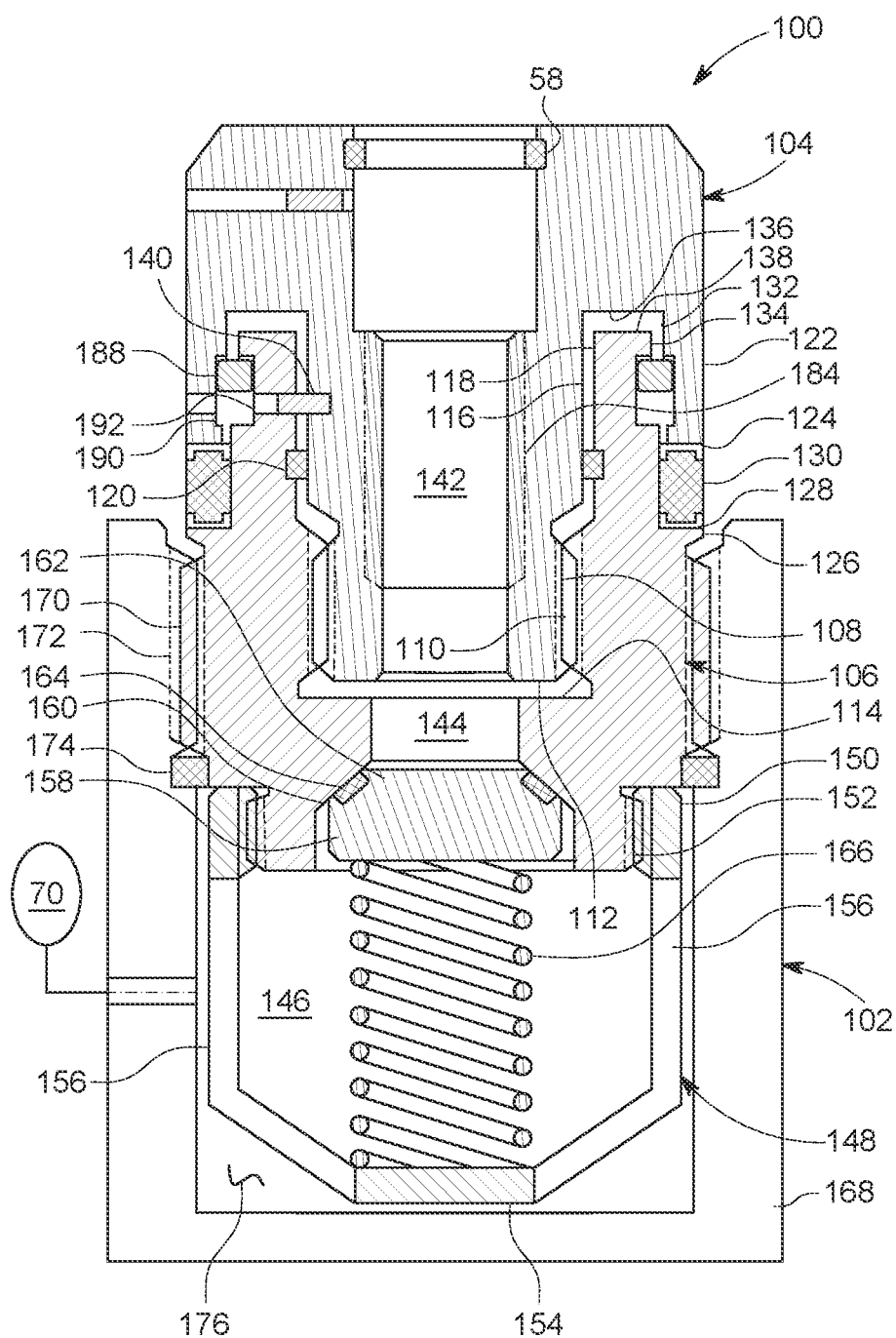
FIG. 5 is a cross sectional view of a third embodiment of a back pressure valve of the present disclosure shown installed in a pressure test fixture.

Referring still to FIG. 5, the upper body 104 comprises a first outer diameter surface 122 and a downward facing shoulder 124 which extends radially inward from the first outer diameter surface. Also, the lower body 104 comprises a second outer diameter surface 126 and an upward facing seat 128 which extends radially inward from the second outer diameter surface. A suitable seal 130, such as a mechanically energized metal end cap elastomer seal, is positioned between the shoulder 124 and the seat 132. As will be described below, the seal 130 is mechanically energized by moving the upper body 104 towards the lower body 106 until the bottom end 112 of the shaft 108 engages the bottom surface 114 of the receptacle 110.

Accordingly, in an initial condition of the back pressure valve 100, the upper body 104 is axially spaced apart from the lower body 106. In the particular embodiment of the back pressure valve 100 shown in FIG. 5, for example, the upper body 106 includes a cylindrical groove 132 which is configured to receive an annular upper end portion 134 of the lower body 106. The groove 132 comprises a bottom surface 136 and the upper end portion 134 comprises a top surface 138 which is initially spaced apart a pre-selected distance from the bottom surface. As will be described more fully below, when the upper body 104 is rotated in a first direction relative to the lower body 106, the upper body will move toward the lower body until the bottom surface 136 engages the top surface 138. This movement will cause the downward facing shoulder 124 to move toward the upward facing seat to thereby energize the seal 130. In the initial condition of the back pressure valve 100, the upper body 104 is kept axially spaced apart from the lower body 106 by means of a shear pin 140 which is mounted in corresponding aligned holes in, e.g., the shaft 108 of the upper body and the upper end portion 134 of the lower body.

The upper body 104 includes a first axial flow bore 142 which is fluidly connected to a second axial flow bore 144 in the lower body 106. In the specific embodiment of the disclosure shown in FIG. 5, the second axial flow bore 144 is fluidly connected to the well bore below the back pressure valve 100 via an open poppet chamber 146. The poppet chamber 146 is defined by a poppet cage 148 that comprises an upper connecting ring 150 which is threadedly connected at 152 to the lower body 106, a support disc 154 which is positioned at the bottom of the poppet cage, and a number of arms 156 which connect the support disc to the connecting ring. The arms 156 are circumferentially spaced around the poppet cage 148 to thereby allow the poppet chamber 146 to freely communicate with the well bore below the back pressure valve 100.

Similar to the back pressure valve 10 described above, the back pressure valve 100 includes a poppet 158 for blocking the flow of fluid from the wellbore to the first and second flow bores 142, 144 but allowing the flow of fluid from the flow bores to the wellbore. The poppet 158 is configured to engage a valve seat 160 which is formed in the second flow bore 144. In this embodiment, the poppet comprises a beveled upper surface 162 on which a suitable annular seal 164 is mounted to seal between the poppet to the valve seat 160 when the poppet is in the closed position. The poppet 158 is biased into the closed position by a spring 166 which is operatively engaged between the support disc 154 and the poppet.

Prior to being installed in the well bore, the back pressure valve 100 may be pressure tested using, e.g., the pressure test fixture 102 shown in FIG. 5. The pressure test fixture 102 comprises a cylindrical housing 168 having a threaded mouth 170 which is configured to engage a set of outer threads 172 on the lower body 106 of the back pressure valve 100. The lower body 106 is sealed to the housing 168 using a suitable annular seal 174 to thereby define a sealed chamber 176 within the housing which is connected to a source of test pressure 70 via a test port 178.

The integrity of the poppet seal 164 is tested by monitoring the pressure within the sealed chamber 176. The chamber 176 is made pressure tight by the seal 120 between the upper and lower bodies 104, 106 and the poppet seal 164. As the test pressure is introduced into the chamber 176, the pressure within the chamber 176 is monitored using conventional means. If the poppet seal 164 or the chamber seal 174 should leak, then the pressure in the chamber 176 will decrease. Thus, a decrease in pressure in the chamber 176 will provide an indication that either the poppet seal 164 or the chamber seal 174 is leaking. Which seal is leaking will be visually obvious. If the poppet seal 164 is leaking, it may then be replaced and re-tested prior to installing the back pressure valve 100 in the well bore.

The procedure for installing the back pressure valve 100 in the well bore will now be described with reference to FIGS. 6 and 7. In these figures, the back pressure valve 100 is shown installed in a tubing hanger 12 which is landed in a wellhead 14 on top of which a tree (not shown) is connected. Prior to installation, upper body 104 is connected to the lower body 106 by threading the shaft 108 into the receptacle 110 until a first hole 180 in the upper body is aligned with a second hole 182 in the lower body, at which point the shear pin 140 is installed in the holes to maintain the proper axial spacing between the bodies. The lower end 52 of the lubricator rod 46 is then threaded into a socket 184 formed in the flow bore 142, the lubricator rod is secured to the upper body 104 with a shear pin 186, and the lubricator (not shown) is connected to the tree.

The back pressure valve 100 is then lowered on the lubricator rod 46 until the outer threads 172 on the lower body 106 land on the inner threads 76 in the tubing hanger bore 18. In this embodiment, the threads 76, 172 are designed to be left-handed threads; thus, after the outer threads 172 land on the inner threads 76, the lubricator rod 46 is rotated counter-clockwise to fully engaged the threads and thereby secure the lower body 106 to the tubing hanger 12 (FIG. 6). At this point, further torque on the lubricator rod 46 in the counter-clockwise direction will act on the threaded connection between the shaft 108 and the receptacle 110, which is also designed to be left-handed. When the torque reaches a predetermined level, the shear pin 140 will break and further rotation of the lubricator rod 46 will cause the upper body 104 to move toward the lower body 106. As described above, this action will cause the shoulder 124 on the upper body 104 to move toward the seat 128 on the lower body 106 and thereby energize the seal 130 (FIG. 7).

The threaded connection between the lower end 52 of the lubricator rod 46 and the socket 184 of the upper body 104 is designed to be right-handed. Thus once the back pressure valve 100 is installed and, if desired, the seal 130 is pressure tested, the lubricator rod 46 can be torqued in the counter-clockwise direction to break the shear pin 186 and unscrew the lubricator rod 46 from the upper body 104, at which point the lubricator can be disconnected from the tree.

Referring again to FIG. 5, the back pressure valve 100 may include a retainer wire 188 to aid in its retrieval from the tubing hanger bore 18. In this example, the retainer wire 188 comprises a square cross section and is received in a pair of opposing first and second circumferential grooves 190, 192 which are formed in the upper and lower bodies 104, 106, respectively. The grooves 190, 192 comprise semi-rectangular cross sections. Accordingly, the first groove 190 defines an upward facing ledge 194 and the second groove defines a downward facing overhang 196 (FIG. 7). As a clockwise torque is applied to the lubricator rod 46 to unscrew the lower body 106 from the inner threads 76 of the tubing hanger bore 18, the torque may instead cause the stem 108 of the upper body 104 to unscrew from the receptacle 110 of the lower body. Once the stem has been unscrewed a predetermined distance from the receptacle 110, the ledge 194 of the first groove 190 will engage the bottom surface of the retainer wire 188 and the overhang 196 of the second groove 192 will engage the top surface of the retainer wire. In this condition, the retainer wire 188 will prevent further axial movement of the upper body 104 away from the lower body 106. Consequently, any clockwise torque which is subsequently applied to the lubricator rod 46 will unscrew the lower body 106 from the tubing hanger bore 18 to allow the back pressure valve 100 to be retrieved.

Figure 8:
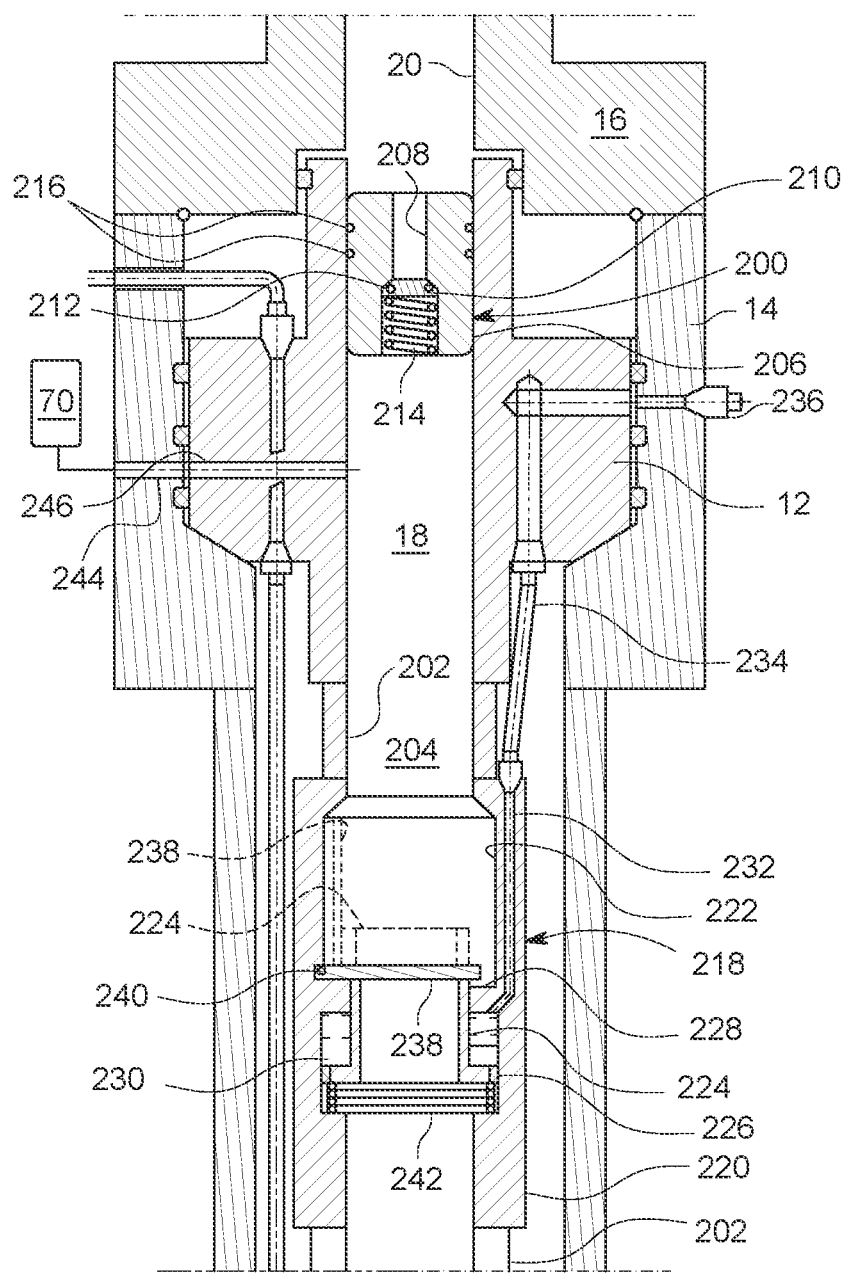
FIG. 8 is a cross sectional view of a fourth embodiment of a back pressure valve and pressure testing system of the present disclosure.

Referring to FIG. 8, a further embodiment of a system for pressure testing a back pressure valve will now be described. This system is capable of pressure testing a variety of back pressure valves, including any of the back pressure valves described herein. In this example, the back pressure valve, generally 200, is shown installed in a tubing hanger 12 which is connected to a string of production tubing 202 through which a production bore 204 extends. The tubing hanger 12 is landed in a wellhead 14, and a tree 16 is connected to the top of the wellhead. In the simplified version shown in FIG. 8, the back pressure valve 200 includes a valve body 206, a flow bore 208 which extends axially through the valve body, a poppet 210 which is movably mounted in the valve body, a poppet seal 212 for sealing the poppet against a corresponding seat which is formed in the flow bore, a spring 214 for biasing the poppet into engagement with the seat, and a pair of body seals 216 for sealing the valve body to the tubing hanger bore 18.

The pressure testing system of this embodiment includes a valve 218 for selectively closing the production bore 204 or the tubing hanger bore 18 below the back pressure valve 200. In the example shown in FIG. 8, the valve 218 comprises a flapper valve. However, the valve 218 could comprise any suitable down hole valve which is capable of being controllably opened and closed, such as, e.g., a ball valve. The flapper valve 218 includes a valve body 220 which is connected, for example, between successive lengths of production tubing 202. In the particular embodiment of the disclosure shown in FIG. 8, the valve body 220 includes an axial through bore 222 within which a cylindrical piston sleeve 224 is positioned. The piston sleeve 224 comprises a lower flange 226 which is sealed to the through bore 222, and the through bore comprises a reduced diameter collar 228 which is sealed to the piston sleeve. In this manner, the flange 226 and the collar 228 define a piston chamber 230 which is connected to an external source of hydraulic fluid (not shown) via, for example, a control bore 232 in the valve body 220 and a conventional control line 234 which connects the control bore to a suitable fitting 236 on the outer wall of the wellhead 14.

A flapper 238 is pivotally connected to the valve body 220 by a pivot pin 240. The flapper 238 is pivotable between a closed position, which is shown by solid lines in FIG. 8, and an open position, which is shown in phantom in FIG. 8. In the closed position, the bottom of the flapper 238 is engaged with the top of the piston 224 to thereby prevent fluid in the tubing hanger bore 18 from flowing through the flapper valve 218 and into the well bore. In the open position, which is the normal position of the flapper valve 218, the flapper 238 is positioned upright to thereby allow fluid in the well bore to flow up through the flapper valve 218 and into the tubing hanger bore 18.

The flapper 238 is maintained in the open position by the piston sleeve 224. When the piston sleeve 224 is in the raised position (shown in phantom in FIG. 8), the upper end of the piston sleeve engages the flapper above the pivot pin 240 to thereby prevent the flapper from closing under the influence of gravity. The piston sleeve 224 is biased into the raised position by a spring 242 which is operatively engaged between the valve body 220 and the flange 226. In order to close the flapper 238, the piston sleeve 224 is moved to the lowered position in which the top of the piston sleeve is positioned below the pivot pin 240. The piston sleeve 224 is moved from the raised position to the lowered position by introducing hydraulic fluid into the piston chamber 230 via the control line 234 and the control bore 232 to thereby force the flange 226 downward relative to the collar 228. When the piston sleeve 224 is in the lowered position, the flapper 238 is allowed to close under the influence of gravity.

In order to test the back pressure valve 200, the flapper valve 218 is closed and test pressure from a source 70 is communicated to the tubing hanger bore 18 through a first communications port 244 in the wellhead 14 and a second communications port 246 in the tubing hanger 12. If the poppet seal 212 or both body seals 216 should leak, the pressure in the tree bore 20, which is monitored using conventional means, will increase. Thus, an increase in the pressure in the tree bore 20 will provide an indication that either the poppet seal 212 or both body seals 216 are leaking. Since the likelihood that both body seals 216 would develop leaks is low, the increase in pressure in the tree bore 20 is more likely and indication that the poppet seal 212 is leaking.

In an alternative embodiment to the arrangement shown in FIG. 8, the first and second communications ports 244, 246 are eliminated. In order to pressure test the poppet seal 212 and the body seals 216, the pressure in the tubing hanger bore 18 is increased, the pressure above the back pressure valve 200 is decreased, and the pressure in the tree bore 20 is monitored using suitable means. If the poppet seal 212 or both body seals 216 should leak, then the pressure in the tree bore 20 will increase. However, the likelihood that both body seals would leak 216 is small. Therefore, an increase in pressure in the tree bore 20 will provide an indication that the poppet seal 212 is likely leaking.

An additional embodiment of the back pressure valve and pressure testing system of the present disclosure will now be described with reference to FIG. 9. The back pressure valve of this embodiment, which is indicated generally by reference number 300, is shown installed in a tubing hanger 12. The tubing hanger 12 is landed in a wellhead 14, and a christmas tree 16 is connected to the top of the wellhead. The back pressure valve 300 includes a valve body 302 which is connectable by suitable means, such as threads 48, to the tubing hanger, a flow bore 304 which extends axially through the body, a poppet chamber 306 which is fluidly connected to the flow bore, and a number of flow-through bores 308 which fluidly connect the poppet chamber to a portion of the tubing hanger bore 18 located below the back pressure valve. A poppet 310 is positioned in the poppet chamber 306 to control the flow of fluid through the flow bore 304. In the particular embodiment of the disclosure shown in FIG. 9, the poppet 310 includes a poppet head 312 which is slidably received in a reduced diameter portion 314 of the poppet chamber 306, a stem 316 which extends from the poppet head axially upward into the flow bore 304, and a shaft 318 which extends axially downward from the poppet head. The poppet head 312 comprises a conical upper surface 320 which engages a corresponding valve seat 322 formed in the flow bore 304. The poppet head 312 is biased into engagement with the valve seat 322 by a spring 324 which is operatively engaged between the bottom of the shaft 318 and a retainer cap 326 which is secured to the bottom of the valve body 302 by suitable means, such as threads.

Figure 9:
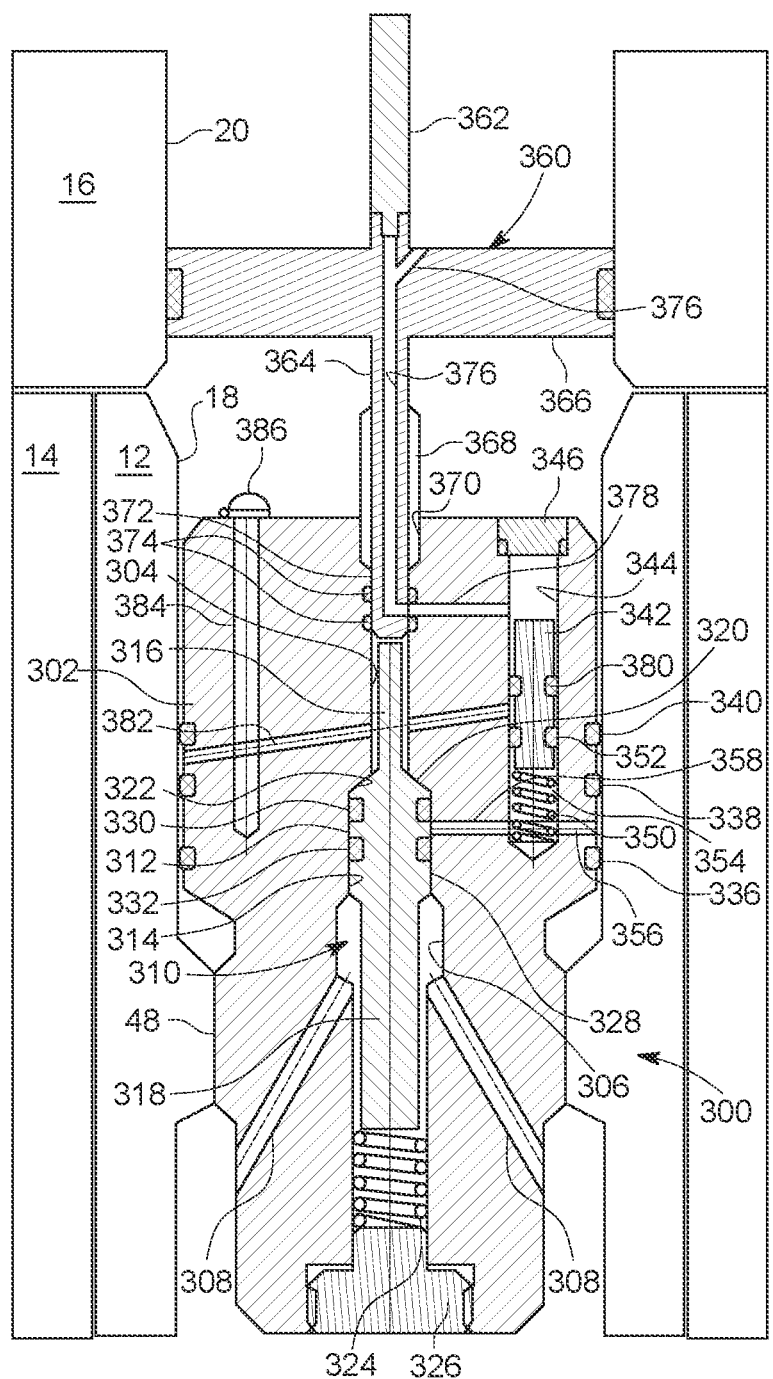
FIG. 9 is a cross sectional view of a fifth embodiment of a back pressure valve and pressure testing system of the present disclosure.

In the embodiment of the back pressure valve 300 shown in FIG. 9, the poppet head 312 comprises a cylindrical side surface 328 which is sealed to the reduced diameter portion 314 of the poppet chamber 206 by first and second (or upper and lower) annular poppet seals 330, 332. The poppet seals 330, 332 may comprise any suitable seal, such as the poppet seals 40, 42 described above. In addition, the valve body 302 is sealed to the tubing hanger bore 18 by, e.g., three suitable annular body seals 336, 338 and 340, the reasons for which will be described below.

As will now be described, the system for pressure testing the back pressure valve 300 allows all primary seals to be tested in the direction of production flow but does not require any breaches of the tubing hanger 12 or the wellhead 14. However, the system is most effective when the back pressure valve 300 is installed in a "wet" environment, for example, when the tubing hanger bore 18 is filled with a non-compressible fluid such as oil or water.

The pressure testing system of this embodiment includes a piston 342 which is positioned in an axial piston bore 344 formed in the valve body 302. The piston bore 344 is sealed by a suitable plug 346. The piston 342 is biased into the upper position shown in FIG. 9 by a spring 350 which is operatively engaged between the bottom of the piston and the bottom of the piston bore 344.

The piston 342 includes a suitable first piston seal 352 for sealing the piston to the piston bore 344 to thereby define a sealed piston chamber 354 between the first piston seal and the bottom of the piston bore. The piston chamber 354 is connected to the space between the first and second body seals 336, 338 by a first port 356 and to the space between the first and second poppet seals 330, 332 by a second port 358. As will be described more fully below, during installation of the back pressure valve 300, fluid from the environment fills the piston chamber 354 through the first and second ports 356, 358.

In this embodiment, the back pressure valve is installed using an installation tool 360 which is connected to the bottom of a lubricator rod 362. The installation tool 360 includes an axial shaft 364 and a radial flange 366 which in the position shown in FIG. 9 is sealed to the tree bore 20.

The shaft 364 includes a threaded section 368 which is configured to engage a threaded socket 370 at the top of the flow bore 304, and a lower end portion 372 which in the position shown in FIG. 9 is sealed to the flow bore by a pair of suitable seals 374. A first bore 376 extends generally axially through the installation tool 360 from the top of the flange 366 to the lower end portion 372 of the shaft 364. In the position shown in FIG. 9, the first bore 376 extends to between the seals 374 and is connected to a second bore 378 which extends through the valve body 302 to a portion of the piston bore 344 located above the first piston seal 352, and preferably above a second piston seal 380 which is positioned above the first piston seal.

Prior to installing the back pressure valve 300, the installation tool 360 is connected to the lubricator rod 362 and the shaft 364 of the installation tool is threaded into the socket 370 at the top of the valve bore 304. The lubricator rod is then rotated to move the shaft 364 down against the stem 316 and force the poppet valve 310 into the open position (in which the flow-through bores 308 are fluidly connected to the flow bore 304). The back pressure valve 300 is then lowered on the lubricator rod 362 and secured to the tubing hanger bore 18, in the manner described above in connection with the back pressure valve 10 for instance. During this procedure, fluid in the tubing hanger bore will bypass the back pressure valve 300 through the flow-through bores 308, the poppet chamber 306, the flowbore 304, and a number of bypass bores, including for example, a first bypass bore 382 which extends between the flow bore and the space between the second and third body seals 338, 340, and a second bypass bore 384 which extends from the first bypass bore to the top of the valve body 302. For reasons which will be made apparent below, the second bypass bore 384 is closed by a check valve 386 which allows fluid in the bypass bore to flow into the tree bore 20 but prevents fluid in the tree bore from flowing into the bypass bore. Once the back pressure valve is secured to the tubing hanger 12, the lubricator rod 362 is rotated to retract the shaft 364 to the position shown in FIG. 9.

As the back pressure valve is lowered into the tubing hanger 12, but before the poppet valve 310 is closed and the first and second body seals 336, 338 engage the tubing hanger bore 18, fluid from the environment will enter the first and second ports 356, 358 and fill the piston chamber 354. The fluid in the piston chamber 354 is then used to pressure test the first and second poppet seals 330, 332. Accordingly, when filled with fluid the piston chamber 354 acts as a source of test pressure.

With the installation tool 360 in the position shown in FIG. 9, test pressure from a suitable source is introduced into the tree bore 20 above the flange 366. This pressure is communicated through the first and second bores 376, 378 into the piston bore 344. The pressure acts on the piston 342, which in turn pressurizes the fluid in the piston chamber 354 The pressure in the piston chamber will be conveyed to the space between the upper and lower poppet seals 330, 332 through the second port 358. If either the upper poppet seal 330, the second body seal 338, the third body seal 340 or the first piston seal 352 should leak, the pressure will escape into the portion of the tree bore 20 located below the flange 366 of the installation tool 360. This will result in a drop in the test pressure as measured at the source and an increase in the pressure in the tree bore below the flange 366, which is measured using known means. On the other hand, If either the lower poppet seal 332 or the first body seal 336 should leak, the test pressure will escape into the well bore. This will result in a drop in the test pressure as measured at the source but no change in the pressure in the tree bore 20 below the flange 366. Thus, a drop in the test pressure at the source combined with an increase in the pressure in the tree bore 20 below the flange 366 will provide an indication that one of the seals 330, 338, 340 or 352 is leaking. Also, a drop in the test pressure at the source, with no increase in the pressure in the tree bore 20 below the flange 366, will provide an indication that one of the seals 332 or 336 is leaking.

Figures 10, 10A:
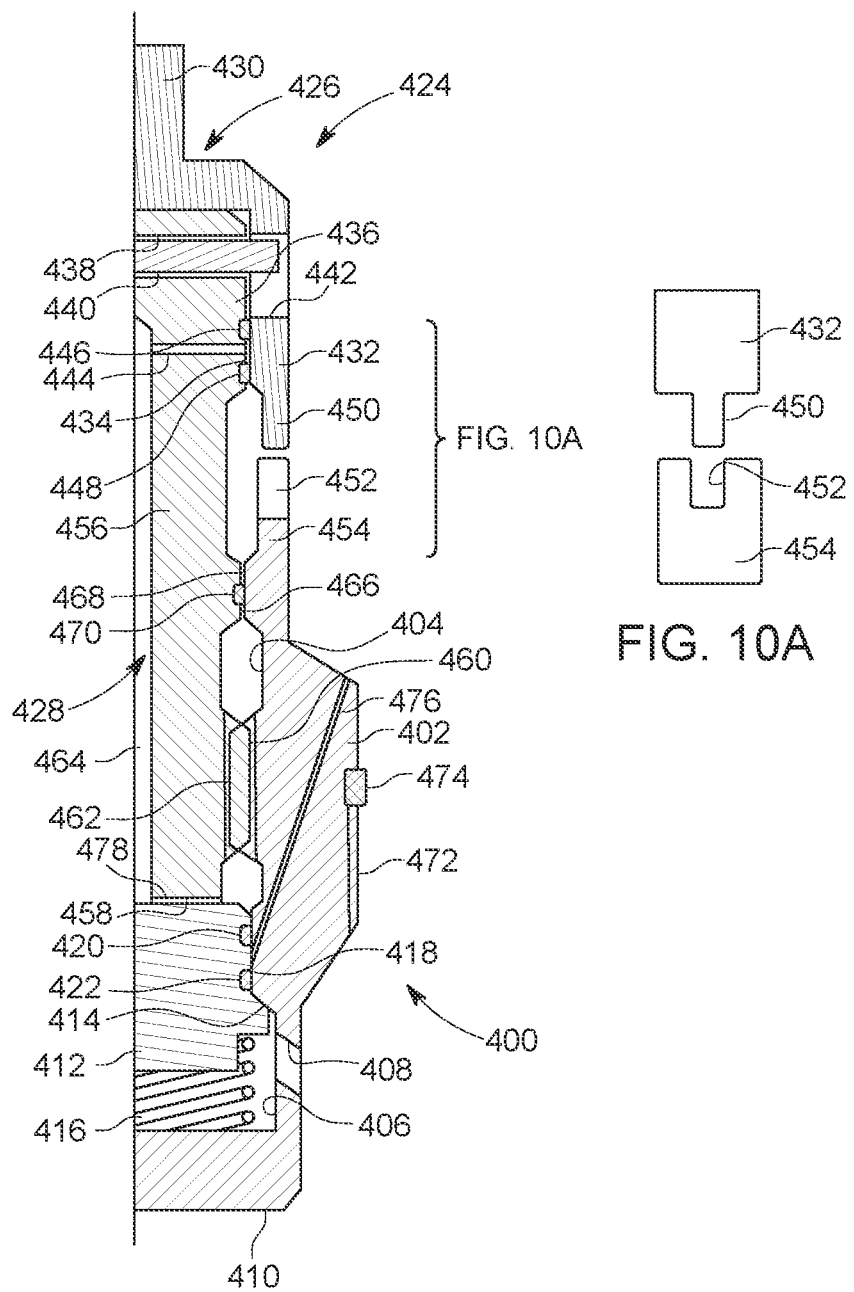
FIG. 10 is a cross sectional view of the right half of a sixth embodiment of a back pressure valve of the present disclosure shown connected to an illustrative embodiment of an installation tool and being configured for testing of the poppet seals and/or the body seal, it being understood that the left half would be a mirror image of the right half.
FIG. 10A is side elevation representation of the portion of the back pressure valve indicated by the designation 10A in FIG. 10.

A further embodiment of a back pressure valve and pressure testing system of the present disclosure is shown in FIG. 10. The back pressure valve of this embodiment, generally 400, includes a generally cylindrical valve body 402 which is configured to be received in the production bore of a tubing hanger which is landed in a wellhead on top of which a christmas tree is connected. For purposes of simplicity, the tubing hanger, wellhead and christmas tree are omitted from FIG. 10. However, reference may be had to FIG. 4, for example, for an indication of the position of the back pressure valve 400 relative to these components.

The valve body 402 includes an axial flow bore 404 which is connected to an enlarged diameter poppet chamber 406 that in turn is connected via a number of flow-through bores 408 to a portion of the tubing hanger bore located below the back pressure valve 400 (see, e.g., FIG. 4). Although the valve body 402 is depicted as having a solid bottom 410, the poppet chamber 406 may alternatively be closed by a retainer cap similar to the retainer cap 30 shown in FIG. 4.

The backpressure valve 400 also includes a poppet 412 which is axially displaceable relative to the poppet chamber 406 and is configured to engage a valve seat 414 which is formed in the flow bore 404 above the poppet chamber 406. The poppet 412 is biased into engagement with the valve seat 410 by a spring 416 which is operatively engaged between the poppet and the bottom 410 of the valve body 402. In the embodiment of the back pressure valve 400 shown in FIG. 10, the poppet 412 comprises a cylindrical side surface 418 which is sealed to the valve bore 404 by suitable first and second (or upper and lower) annular poppet seals 420, 422.

Figure 11:
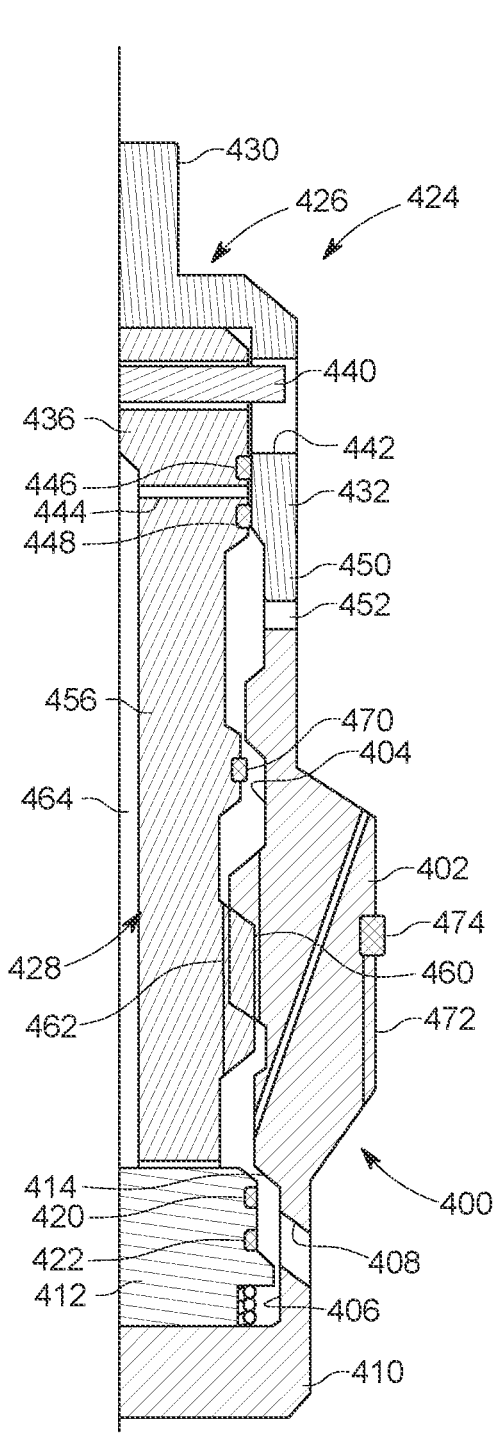
FIG. 11 is a cross sectional view of the back pressure valve of FIG. 10 shown configured for installation in a well bore.
Figure 12:
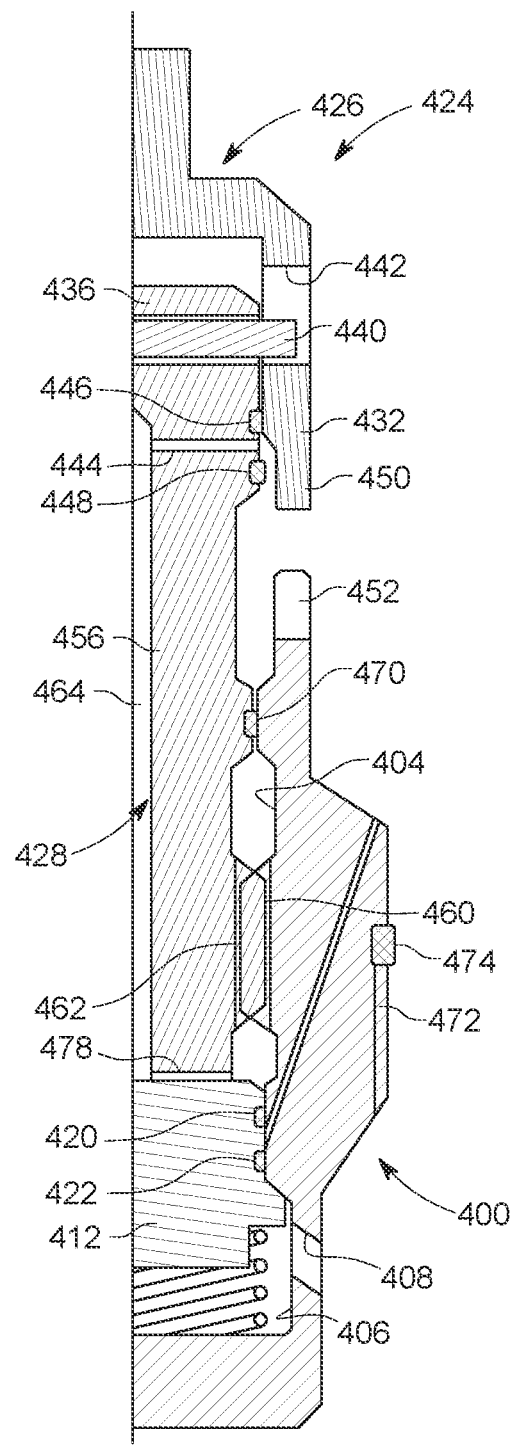
FIG. 12 is a cross sectional view of the back pressure valve of FIG. 10 shown configured for retrieval of the installation tool.

Referring also to FIGS. 11 and 12, the poppet 412 is movable between a closed position (FIGS. 10 and 12) in which fluid is prevented from flowing upward through the flow-through bores 408 and the flow bore 404, and an open position (see, e.g., FIG. 11) in which fluid is permitted to flow downward through the flow bore and the flow-through bores. When the poppet 412 is in the closed position, the first and second poppet seals 420, 422 engage corresponding surfaces located in the flow bore 404 above the valve seat 414. In this position, the second poppet seal 422 (or should the second poppet seal fail, the first poppet seal 420) will block fluid from flowing through the flow bore 404 and accordingly prevent fluid in the well bore from flowing into the tree. When the poppet 412 is in the open position, the first (or upper) poppet seal 420 is positioned in the poppet chamber 406. In this position, fluid is permitted to flow through the flow bore 404, and the back pressure valve 400 will thus allow fluid from the tree to flow into the well bore.

In the embodiment shown in FIGS. 10-12, although the valve seat 414 is located below the second poppet seal 422 when the poppet 412 is in the closed position, valve body 402 and/or the poppet could alternatively be configured such that the valve seat is located above the first poppet seal 420 when the poppet is in the closed position. In this alternative embodiment, the valve body 402 and/or the poppet 412 would be configured such that the first (or upper) poppet seal 420 is positioned in the poppet chamber 406 when the poppet is in the open position.

The back pressure valve 400 is installed in the tubing hanger production bore using an installation tool 424. The installation tool 424 includes an upper tool part 426 which is axially movably connected to a lower tool part 428. The upper tool part 426 is connectable to a lubricator rod (not shown) by suitable means, such as a connecting rod 430, and includes a collar 432 which defines a cylindrical recess 434 within which a head portion 436 of the lower tool part 428 is slidably received. The head portion 436 includes a lateral bore 438 within which a connecting pin 440 is received. The connecting pin 440 extends into an axially elongated opening 442 in the collar 432 to thereby secure the upper tool part 426 to the lower tool part 428 while allowing these two parts to move axially relative to each other. The head portion 436 also includes a lateral through hole 444 and a pair of suitable seals 446, 448 which are positioned above and below the through hole, respectively, and are configured to seal against the recess 434 in the position of the installation tool shown in FIG. 10, that is, when the upper tool part 426 is in a lowered position relative to the lower tool part 428. The purpose of the through hole 444 will be made apparent below.

Referring also to FIG. 10A, the upper tool part 426 also includes a number of lugs 450, each of which depends downwardly from the collar 432 and is configured to engage a corresponding upward facing slot 452 formed on an upper rim portion 454 of the valve body 402. Alternatively, the valve body 402 and the upper tool part 426 could be configured such that the lugs 450 are formed on the upper rim portion 454 and the slots 452 are formed on the collar 432. The purpose of the lugs 450 and slots 452 will be made apparent below.

The lower tool part 428 also includes an axially extending leg portion 456 which depends downwardly from the head portion 436. The leg portion 456 comprises a bottom 458 which is configured to engage the poppet 412, a set of external threads 460 which are configured to engage a corresponding set of internal threads 462 formed in the valve body 402, for instance in the flow bore 404, an axial bore 464 which extends from the bottom 458 to above the lateral through hole 444, and an enlarged diameter outer surface portion 466, which in the position of the installation tool 424 shown in FIG. 10 is configured to be sealed against a corresponding reduced diameter inner surface portion 468 of the valve body by a suitable seal 470.

The installation tool 424 is assembled with the back pressure valve 400 by inserting the leg portion 456 into the valve body 402 until the external threads 460 engage the internal threads 462. The installation tool 424 is then rotated relative to the back pressure valve 400 to move the leg portion 456 axially downward relative to the valve body 402 until the bottom 458 of the leg portion contacts the poppet 412, after which the installation tool is rotated further relative to the back pressure valve until the poppet contacts the bottom 410 of the valve body. This is the position of the back pressure valve 400 and the installation tool 424 shown in FIG. 11. It should be noted that, as the installation tool 424 is rotated relative to the back pressure valve 400, the upper tool part 426 is in a raised position (such as shown in FIG. 12), and the lugs 450 are therefore spaced apart from the slots 452 so as not to interfere with the rotation.

With the back pressure valve 400 and the installation tool 424 in the position shown in FIG. 11, the back pressure valve is installed in the tubing hanger production bore by first connecting the upper tool part 426 to a lubricator rod (not shown) and then lowering the back pressure valve through the tree and into the tubing hanger. To ensure that the lugs 450 remain engaged with the slots 452 during this step, the upper tool part 426 may be secured to the head portion 436 via a shear pin (not shown) which is sufficiently weak to enable the lubricator operator to break the connection. Once a set of main threads 472 on the valve body 402 lands on the internal production bore threads (not shown), the lubricator rod is rotated to screw the valve body into the production bore threads to thereby secure the back pressure valve 400 in the production bore. During this step, rotation of the lubricator rod is transmitted to the valve body 402 through engagement of the lugs 450 with the slots 452. With the back pressure valve 400 secured in the production bore, a body seal 474 on the outer diameter surface of the valve body 402 will engage the production bore to seal the valve body against the tubing hanger.

Once the back pressure valve 400 is fully installed in the tubing hanger production bore, the lubricator rod is: (1) lifted to retract the lugs 450 from the slots 452 and uncover the lateral through hole 444 in the head portion 436 (to prevent a vacuum from developing between the seals 470 and 446, 448 during the next step), (2) rotated to unscrew the lower tool part 456 from the internal threads 462 on the valve body 402 until the poppet valve 212 reaches its closed position, and (3) lowered to lower the upper tool part 426 relative to the lower tool part 428 until the collar 432 covers the lateral through hole 444 and the seal 448 is sealed against the recess 434. This is the position of the back pressure valve 400 and the installation tool 424 shown in FIG. 10, which can be referred to as the test position.

Once in the test position, the first and second poppet seals 420, 422 and the body seal 474 may be pressure tested. In the embodiment of the disclosure shown in FIG. 10, the pressure testing system includes a pressure test port 476 which extends through the valve body 402 from an outer surface portion of the valve body located above the body seal 474 to a portion of the flow bore 404 located between the first and second poppet seals 420, 422 when the poppet 412 is in the closed position. In order to pressure test the seals, test pressure from a suitable source is introduced into the tree bore by conventional means. The test pressure is communicated from the tree bore through the test port 476 to the space between the first and second poppet seals 420, 422.

If the first or upper poppet seal 420 should leak, the test pressure will enter the flow bore 404 above the poppet 412 (the upper end of which is sealed by the seal 470) and the axial bore 464 in the leg portion 456 (the upper end of which is connected to the lateral through hole 444, which in turn is closed by the collar 432). In this regard, the leg portion 456 may be provided with a lateral port 478 to facilitate communication of the test pressure between the flow bore 404 and the axial bore 464. The test pressure in the flow bore 404 and the axial bore 464 will force the poppet 212 open and flow past the poppet into the well bore, which will result in a drop in the test pressure as measured at the source. Likewise, If the second or lower poppet seal 422 should leak, the test pressure will escape into the well bore, which will likewise result in a drop in the test pressure as measured at the source. Finally, if the body seal 474 should leak, the test pressure will escape into the well bore, which will also result in a drop in the test pressure as measured at the source. Thus a decrease in the test pressure as measured at the source will provide an indication that either the upper poppet seal 420, the lower poppet seal 422 or the body seal 474 has failed.

Once the seals 420, 422, 474 have been tested, the installation tool 424 may be retrieved. This is accomplished by lifting the lubricator rod to raise the upper tool part 426 relative to the lower tool part 428 and thereby uncover the lateral through hole 444. The lubricator rod is then rotated to completely unthread the valve body 402 from the tubing hanger production bore threads. During this action, the through hole 444 and the lateral port 478 will connect the portion of the flow bore 404 located above the poppet 212 to the surrounding environment to ensure that a vacuum does not develop between the poppet seals 420, 422 and the seal 470, which could make retrieval of the installation tool 424 difficult.

The back pressure valve 400 may be retrieved from the tubing hanger production bore using the retrieval tool shown in FIG. 13. The retrieval tool of this embodiment, generally 480, includes an upper tool part 482 and a lower tool part 484. The upper tool part 482 is connectable to a lubricator rod (not shown) by suitable means, such as a connecting rod 486, and includes a collar 488 which comprises a cylindrical recess 490. The lower tool part 484 includes an upper head portion 492 which is configured to be received in the recess 490. The head portion 492 includes a lateral bore 494 within which a connecting pin 496 is received. The connecting pin 496 extends into an aligned opening 498 in the collar 488 to thereby secure the upper tool part 482 to the lower tool part 484.

The lower tool part 484 also includes an axially extending leg portion 500 which depends downwardly from the head portion 492. The leg portion 500 includes a bottom 502 which may or may not be configured to engage the poppet 412, a set of external threads 504 which are configured to engage the internal threads 462 on the valve body 402, an enlarged diameter outer surface portion 506 which in the position of the retrieval tool 480 shown in FIG. 13 is configured to be sealed against the inner surface portion 468 of the valve body by a suitable seal 508, and an axial bore 510 which extends completely through the lower tool part 484.

A check valve mechanism 512 is mounted in the head portion 492 at the top of the axial bore 510. Referring to FIG. 13A, the check valve mechanism 512 includes a cylindrical retainer 514 which is secured such as by threads 516 in a counterbore 518 located at the top of the axial bore 510. The retainer 514 includes a top portion 520 which comprises a flow port 522 that is fluidly connected to the lateral bore 498 within which the pin 496 is positioned. A closure member 524 is slidably received in the retainer 514. The closure member 524 comprises a downwardly directed sealing surface 526 which is configured to engage a valve seat 528 that is formed in the head portion 492 between the axial bore 510 and the counterbore 518. If desired, the valve seat 528 may comprise an appropriate seal which is mounted in the head portion 500 between the axial bore 510 and the counterbore 518.

The closure member 524 is biased into the closed position shown in FIG. 13A by a spring 530 which is operatively engaged between the closure member and the retainer 514. In the closed position, the check valve mechanism 512 prevents fluid from flowing through the counterbore 518 into the axial bore 510. However, when the pressure of the fluid in the axial bore 510 is greater than the pressure in the tree bore, the fluid will displace the closure member 524 from the valve seat 528 and flow through the flow port 522 and the lateral bore 498 into the tree bore.

To connect the retrieval tool 480 to the back pressure valve 400, the upper tool part 482 is connected to a lubricator rod and lowered through the tree and the tubing hanger bore until the external threads on the leg portion 500 contact the internal threads 462 on the valve body 402. The lubricator rod is then rotated to screw the leg portion 500 into the valve body 402 until a radial flange 532 on the lower tool part 484 engages the upper rim portion 454 of the valve body 402. During this action, any fluid which is trapped in the flow bore 404 between the poppet seals 420, 422 and the seal 508 will escape through a lateral port 534 in the leg portion 500 (when the bottom 502 of the leg portion is configured to engage the poppet 412), through the axial bore 510, through the check valve mechanism 512, and through the lateral bore 498 into the tree bore. By allowing the fluid in the flow bore 404 to escape as just described, the torque required to screw the leg portion 500 into the valve body 402 will be significantly reduced.

After the flange 532 engages the upper rim portion 454, further rotation of the lubricator rod in the same direction will cause the valve body 402 to rotate and unscrew from the tubing hanger production bore threads. Once the main threads 472 are clear of the production bore threads, the lubricator can be lifted to remove the back pressure valve 400 from the tubing hanger bore.

If required, the retrieval tool 480 may also be used to test the poppet seals 420, 422 and the body seal 474. With the back pressure valve 400 and the retrieval tool 480 in the position shown in FIG. 13, test pressure from a suitable source is introduced into the tree bore by conventional means. The test pressure is communicated from the tree bore through the test port 476 to the space between the upper and lower poppet seals 420, 422. If the upper poppet seal 420 should fail, the test pressure will enter the flow bore 404 and the axial bore 510 (via the port 534), force the poppet 212 open and flow past the poppet into the well bore, which will result in a drop in the test pressure as measured at the source. It should be noted that during this action, the test pressure in the axial bore 510 will not escape past the check valve mechanism 512 because the test pressure below the closure member 524 is equalized by the test pressure above the closure member (which is communicated to the closure member through the lateral bore 498 and the through flow port 522 in the valve retainer 514), and the spring 530 will therefore maintain the closure member in the closed position.

If the second or lower poppet seal 422 should leak, the test pressure will escape into the well bore, which will likewise result in a drop in the test pressure as measured at the source. Finally, if the body seal 474 should leak, the test pressure will escape into the well bore, which will also result in a drop in the test pressure as measured at the source. Thus a decrease in the test pressure as measured at the source will provide an indication that either the upper poppet seal 420, the lower poppet seal 422 or the body seal 474 has failed.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A testable back pressure valve for controlling fluid flow through a bore of a component which is installed in a well bore, the back pressure valve comprising:

a valve body which is configured to be secured in the bore;
a flow bore which extends through the valve body;
at least a first body seal which is configured to seal the valve body to the bore;
a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve;
at least a first poppet seal which is sealingly engaged between the poppet and the valve body when the poppet is in the closed position; and
a test port which extends through the valve body from an outer surface portion of the valve body to below the first poppet seal when the poppet is in the closed position;
wherein with the back pressure valve installed in the bore and the poppet in the closed position, the first poppet seal can be pressure tested by communicating a test pressure through the test port to below the first poppet seal;
wherein the test port extends through the valve body from below the first body seal;
wherein with the back pressure valve installed in the bore and the poppet in the closed position, the first body seal can be pressure tested by communicating test pressure to a portion of the bore located below the first body seal, and the first poppet seal can be pressure tested by communicating the test pressure through the test port to below the first poppet seal;
a second poppet seal which is positioned below the first poppet seal and is sealingly engaged between the poppet and the valve body when the poppet is in the closed position;
wherein the test port extends through the valve body to between the first and second poppet seals; and
wherein with the back pressure valve installed in the bore and the poppet in the closed position, the first and second poppet seals can be pressure tested by communicating the test pressure through the test port to between the first and second poppet seals.

2. The testable back pressure valve of claim 1, further comprising:
a second body seal which is positioned below the first body seal and is configured to seal the valve body to the bore;
wherein the test port extends through the valve body from between the first and second body seals; and
wherein with the back pressure valve installed in the bore and the poppet in the closed position, the first and second body seals can be pressure tested by communicating test pressure to a portion of the bore located between the first and second body seals, and the first and second poppet seals can be pressure tested by communicating the test pressure through the test port to between the first and second poppet seals.

3. A testable back pressure valve for controlling fluid flow through a bore of a component which is installed in a well bore, the back pressure valve comprising:
a valve body which is configured to be secured in the bore;
a flow bore which extends through the valve body;
at least a first body seal which is configured to seal the valve body to the bore;
a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve;
at least a first poppet seal which is sealingly engaged between the poppet and the valve body when the poppet is in the closed position; and
a test port which extends through the valve body from an outer surface portion of the valve body to below the first poppet seal when the poppet is in the closed position;
wherein with the back pressure valve installed in the bore and the poppet in the closed position, the first poppet seal can be pressure tested by communicating a test pressure through the test port to below the first poppet seal;
wherein the test port extends through the valve body from below the first body seal;
wherein with the back pressure valve installed in the bore and the poppet in the closed position, the first body seal can be pressure tested by communicating test pressure to a portion of the bore located below the first body seal, and the first poppet seal can be pressure tested by communicating the test pressure through the test port to below the first poppet seal;
wherein the component comprises a hanger device which is landed in a wellhead component, wherein the bore comprises a hanger device bore which extends axially through the hanger device, and wherein the test pressure is communicated to the test port through a first communications port in the hanger device; and
wherein the test pressure is communicated to the first communications port through a pressure control device which is mounted to the wellhead component above the hanger device.

4. The testable back pressure valve of claim 3, wherein the pressure control device comprises a pressure control device bore which is connected to the hanger device bore, and wherein the test pressure is communicated to the first communications port through the pressure control device bore and the hanger device bore.

5. A testable back pressure valve for controlling fluid flow through a bore of a component which is installed in a well bore, the back pressure valve comprising:
a valve body which is configured to be secured in the bore;
a flow bore which extends through the valve body;
at least a first body seal which is configured to seal the valve body to the bore;
a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve;
at least a first poppet seal which is sealingly engaged between the poppet and the valve body when the poppet is in the closed position; and
a test port which extends through the valve body from an outer surface portion of the valve body to below the first poppet seal when the poppet is in the closed position;

wherein with the back pressure valve installed in the bore and the poppet in the closed position, the first poppet seal can be pressure tested by communicating a test pressure through the test port to below the first poppet seal;

wherein the test port extends through the valve body from below the first body seal;

wherein with the back pressure valve installed in the bore and the poppet in the closed position, the first body seal can be pressure tested by communicating test pressure to a portion of the bore located below the first body seal, and the first poppet seal can be pressure tested by communicating the test pressure through the test port to below the first poppet seal;

wherein the component comprises a hanger device which is landed in a wellhead component, wherein the bore comprises a hanger device bore which extends axially through the hanger device, and wherein the test pressure is communicated to the test port through a first communications port in the hanger device; and wherein the test pressure is communicated to the first communications port through a second communications port in the wellhead component.

6. A testable back pressure valve for controlling fluid flow through a bore of a component which is installed in a well bore, the back pressure valve comprising:

a valve body which is configured to be secured in the bore;

a flow bore which extends through the valve body;

at least a first body seal which is configured to seal the valve body to the bore;

a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve;

at least a first poppet seal which is sealingly engaged between the poppet and the valve body when the poppet is in the closed position; and a test port which extends through the valve body to below the first poppet seal when the poppet is in the closed position;

wherein with the back pressure valve installed in the bore and the poppet in the closed position, the first poppet seal can be pressure tested by communicating a test pressure through the test port to below the first poppet seal; and wherein the first body seal comprises an uppermost body seal between the valve body and the bore and the test port extends through the valve body from above the first body seal; wherein with the back pressure valve installed in the bore and the poppet in the closed position, the first body seal can be pressure tested by communicating test pressure to a portion of the bore located above the first body seal, and the first poppet seal can be pressure tested by communicating the test pressure through the test port to below the first poppet seal.

7. The testable back pressure valve of claim 6, further comprising:

a second poppet seal which is positioned below the first poppet seal and is sealingly engaged between the poppet and the valve body when the poppet is in the closed position;

wherein the test port extends through the valve body to between the first and second poppet seals; and wherein with the back pressure valve installed in the bore and the poppet in the closed position, the first and second poppet seals can be pressure tested by communicating the test pressure through the test port to between the first and second poppet seals.

8. The testable back pressure valve of claim 6, wherein the component comprises a hanger device which is landed in a wellhead component, wherein the bore comprises a hanger device bore which extends axially through the hanger device, and wherein the test pressure is communicated to the test port through a pressure control device which is mounted to the wellhead component above the hanger device.

9. The testable back pressure valve of claim 8, wherein the pressure control device comprises a pressure control device bore which is connected to the hanger device bore, and wherein the test pressure is communicated to the test port through the pressure control device bore and the hanger device bore.

10. A method for installing a back pressure valve in a component which is positioned in a well bore and then testing the back pressure valve, the back pressure valve comprising a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position, the method comprising:

securing the valve body in the bore;

with the poppet in the closed position, communicating a test pressure to below the first poppet seal; and monitoring at least one of a pressure of the test pressure and a pressure in a space above the back pressure valve;

wherein a change in at least one of the pressure of the test pressure and the pressure in the space above the back pressure valve is an indication that the first poppet seal has failed;

during the step of communicating the test pressure to below the first poppet seal, simultaneously communicating the test pressure to below the first body seal;

wherein a change in at least one of the pressure of the test pressure and the pressure in the space above the back pressure valve is an indication that at least one of the first poppet seal and the first body seal has failed; and wherein the back pressure valve comprises a second poppet seal which is positioned below the first poppet seal and is sealingly engaged between the poppet and the valve body when the poppet is in the closed position, and wherein the method further comprises:

during the step of communicating the test pressure to below the first poppet seal, simultaneously communicating the test pressure to between the first and second poppet seals;

where a decrease in the pressure of the test pressure is an indication that the second poppet seal has failed; and wherein an increase in the pressure in the space above the back pressure valve is an indication that at least one of the first poppet seal and the first body seal has failed.

11. The method of claim 10, wherein the back pressure valve comprises a second body seal which is positioned below the first body seal and is configured to seal the valve body to the bore, and wherein the method further comprises:
- during the step of communicating the test pressure to between the first and second poppet seals, simultaneously communicating the test pressure to between the first and second body seals;
- where a decrease in the pressure of the test pressure is an indication that at least one of the second poppet seal and the second body seal has failed; and
- wherein an increase in the pressure in the space above the back pressure valve is an indication that at least one of the first poppet seal and the first body seal has failed.

12. The method of claim 10, further comprising:
- sealing the bore below the back pressure valve prior to the step of communicating the test pressure to below the first poppet seal and simultaneously communicating the test pressure to below the first body seal;
- wherein an increase in the pressure in the space above the back pressure valve is an indication that at least one of the first poppet seal and the first body seal has failed.

13. The method of claim 12, wherein the steps of communicating the test pressure to below the first poppet seal and to below the first body seal comprises decreasing the pressure in the space above the back pressure valve to below a pressure in the sealed bore below the back pressure valve.

14. The method of claim 10, wherein the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises:
- sealing the flow bore above the poppet;
- wherein a decrease in the pressure of the test pressure is an indication that the first poppet seal has failed.

15. A method for installing a back pressure valve in a component which is positioned in a well bore and then testing the back pressure valve, the back pressure valve comprising a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position, the method comprising:
- securing the valve body in the bore;
- with the poppet in the closed position, communicating a test pressure to below the first poppet seal; and
- monitoring at least one of a pressure of the test pressure and a pressure in a space above the back pressure valve;
- wherein a change in at least one of the pressure of the test pressure and the pressure in the space above the back pressure valve is an indication that the first poppet seal has failed;
- wherein the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises:
- sealing the flow bore above the poppet;
- wherein a decrease in the pressure of the test pressure is an indication that the first poppet seal has failed; and
- during the step of communicating the test pressure to below the first poppet seal, simultaneously communicating the test pressure to above the first body seal;
- wherein a decrease in the pressure of the test pressure is an indication that at least one of the first poppet seal and the first body seal has failed.

16. The method of claim 15, wherein the back pressure valve comprises a second poppet seal which is positioned below the first poppet seal and is sealingly engaged between the poppet and the valve body when the poppet is in the closed position, and wherein the method further comprises:
- during the step of communicating the test pressure to below the first poppet seal, simultaneously communicating the test pressure to between the first and second poppet seals;
- wherein a decrease in the pressure of the test pressure is an indication that at least one of the first poppet seal, the second poppet seal and the first body seal has failed.

17. The method of claim 16, wherein the back pressure valve comprises a second body seal which is positioned above the first body seal and is configured to seal the valve body to the bore, and wherein the method further comprises:
- during the step of communicating the test pressure to between the first and second poppet seals, simultaneously communicating the test pressure to between the first and second body seals;
- where a decrease in the pressure of the test pressure is an indication that at least one of the first poppet seal, the second poppet seal and the first body seal has failed; and
- wherein an increase in the pressure in the space above the back pressure valve is an indication that the second body seal has failed.

18. A method for installing a back pressure valve in a component which is positioned in a well bore and then testing the back pressure valve, the back pressure valve comprising a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position, the method comprising:
- securing the valve body in the bore;
- with the poppet in the closed position, communicating a test pressure to below the first poppet seal; and
- monitoring at least one of a pressure of the test pressure and a pressure in a space above the back pressure valve;
- wherein a change in at least one of the pressure of the test pressure and the pressure in the space above the back pressure valve is an indication that the first poppet seal has failed;
- wherein the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises:

sealing the flow bore above the poppet;

wherein a decrease in the pressure of the test pressure is an indication that the first poppet seal has failed; and wherein the step of communicating the test pressure to below the first poppet seal comprises introducing the test pressure into the space above the back pressure valve.

19. A method for installing a back pressure valve in a component which is positioned in a well bore and then testing the back pressure valve, the back pressure valve comprising a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position, the method comprising:

securing the valve body in the bore;

with the poppet in the closed position, communicating a test pressure to below the first poppet seal; and monitoring at least one of a pressure of the test pressure and a pressure in a space above the back pressure valve;

wherein a change in at least one of the pressure of the test pressure and the pressure in the space above the back pressure valve is an indication that the first poppet seal has failed;

wherein the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises:

sealing the flow bore above the poppet;

wherein a decrease in the pressure of the test pressure is an indication that the first poppet seal has failed; and prior to the step of securing the valve body in the bore, connecting the valve body to an installation tool; and lowering the back pressure valve through the bore on the installation tool;

wherein the step of sealing the flow bore above the poppet comprises sealing the installation tool to a portion of the valve body located in or contiguous with the flow bore.

20. A method for installing a back pressure valve in a component which is positioned in a well bore and then testing the back pressure valve, the back pressure valve comprising a valve body which is configured to be secured in a bore of the component, a flow bore which extends through the valve body, at least a first body seal which is configured to seal the valve body to the bore, a poppet which is movably positioned in the valve body, the poppet being movable between a closed position in which fluid is prevented from flowing upward through the flow bore from below the back pressure valve and an open position in which fluid is permitted to flow downward through the flow bore from above the back pressure valve, and at least a first poppet seal which is sealingly engaged between the poppet and the valve body when the poppet is in the closed position, the method comprising:

securing the valve body in the bore;

with the poppet in the closed position, communicating a test pressure to below the first poppet seal; and monitoring at least one of a pressure of the test pressure and a pressure in a space above the back pressure valve;

wherein a change in at least one of the pressure of the test pressure and the pressure in the space above the back pressure valve is an indication that the first poppet seal has failed;

wherein the back pressure valve comprises a test port which extends through the valve body to below the first poppet seal when the poppet is in the closed position, wherein the step of communicating the test pressure to below the first poppet seal comprises communicating the test pressure through the test port, and wherein the method further comprises:

sealing the flow bore above the poppet;

wherein a decrease in the pressure of the test pressure is an indication that the first poppet seal has failed; and wherein the back pressure valve comprises a piston chamber within which a piston is slidably received, wherein the test port is connected to the piston chamber on a first side of the piston, and wherein the step of communicating the test pressure to below the first poppet seal comprises:

filling the test port with a well fluid; and communicating the test pressure to the piston chamber on a second side of the piston;

wherein the test pressure is transmitted through the piston to the well fluid in the test port.

\* \* \* \* \*